(12) United States Patent
Kobayashi

(10) Patent No.: US 12,211,246 B2
(45) Date of Patent: Jan. 28, 2025

(54) IMAGE PROCESSING METHOD

(71) Applicant: LOGIC AND DESIGN Co., LTD, Tokyo (JP)

(72) Inventor: Masahiro Kobayashi, Tokyo (JP)

(73) Assignee: LOGIC AND DESIGN Co., LTD, Tokyo (JP)

( * ) Notice: Subject to any disclaimer, the term of this patent is extended or adjusted under 35 U.S.C. 154(b) by 238 days.

(21) Appl. No.: 17/632,644

(22) PCT Filed: Jul. 20, 2021

(86) PCT No.: PCT/JP2021/027235
§ 371 (c)(1),
(2) Date: Feb. 3, 2022

(87) PCT Pub. No.: WO2022/158010
PCT Pub. Date: Jul. 28, 2022

(65) Prior Publication Data
US 2023/0162473 A1    May 25, 2023

(30) Foreign Application Priority Data

Jan. 22, 2021 (JP) .................... 2021-009066
Feb. 9, 2021 (JP) .................... 2021-018690
Apr. 6, 2021 (JP) .................... 2021-064589

(51) Int. Cl.
*G06V 10/75*    (2022.01)
*G06T 5/40*    (2006.01)
(Continued)

(52) U.S. Cl.
CPC ............. *G06V 10/751* (2022.01); *G06T 5/40* (2013.01); *G06T 5/50* (2013.01); *G06T 5/70* (2024.01);
(Continued)

(58) Field of Classification Search
CPC ...... H04N 23/741; H04N 5/57; H04N 23/843; H04N 9/68; H04N 23/70; H04N 25/581;
(Continued)

(56) References Cited

U.S. PATENT DOCUMENTS 7,406,193 B2 * 7/2008 Watanabe .................. G06T 5/92
348/94
7,636,472 B2 * 12/2009 Maruoka ........... G06V 30/18095
382/167
(Continued)

FOREIGN PATENT DOCUMENTS

JP    2002-084449 A    3/2002
JP    2002-142150 A    5/2002
(Continued)

OTHER PUBLICATIONS

Machine translation of JP-2004229259-A obtained from google patents (Year: 2004).*
(Continued)

*Primary Examiner* — Aaron W Carter
*Assistant Examiner* — Courtney Joan Nelson
(74) *Attorney, Agent, or Firm* — United IP Counselors, LLC

(57) ABSTRACT

An image processing method is disclosed. The image processing method includes setting n reference pixels around a pixel of interest, where n is an integer, sequentially comparing a pixel value of the pixel of interest with a pixel value of each reference pixel, counting a number of the reference pixels whose pixel values are less than or equal to the pixel value of the pixel of interest, incrementing a histogram value of each reference pixel by 1 to compare with a preset inclination limit value, counting a number of the reference pixels satisfying both a condition that the reference pixel value is less than or equal to the pixel value of the pixel of
(Continued)

interest and a condition that the histogram value is less than or equal to the inclination limit value so as to obtain a true-in-both count value, and proportionally distributing the true-in-both count value for output.

11 Claims, 30 Drawing Sheets
(30 of 30 Drawing Sheet(s) Filed in Color)

(51) Int. Cl.
| | | |
|---|---|---|
| *G06T 5/50* | (2006.01) | |
| *G06T 5/70* | (2024.01) | |
| *G06T 5/73* | (2024.01) | |
| *G06V 10/60* | (2022.01) | |

(52) U.S. Cl.
CPC ............... *G06T 5/73* (2024.01); *G06V 10/60* (2022.01); *G06T 2207/20221* (2013.01)

(58) Field of Classification Search
CPC ........ H04N 1/60; H04N 23/76; H04N 19/117; H04N 23/71; H04N 9/646; H04N 9/77; H04N 19/186; H04N 23/6811; H04N 19/126; G09G 2320/066; G09G 2320/0613; G06T 5/50; G06T 5/40; G06T 5/70; G06T 2207/20221; G06T 5/73; G06T 11/001; G06T 5/94; G06T 7/90; G06V 10/751; G06V 10/758; G06V 10/60
See application file for complete search history.

(56) References Cited

U.S. PATENT DOCUMENTS

| | | | |
|---|---|---|---|
| 8,515,170 B2* | 8/2013 | Morimoto | ................ G06T 5/92 |
| | | | 382/169 |
| 2011/0273748 A1* | 11/2011 | Kobayashi | ................ G06T 5/40 |
| | | | 358/448 |

FOREIGN PATENT DOCUMENTS

| | | | | |
|---|---|---|---|---|
| JP | 2003-051944 | A | | 2/2003 |
| JP | 2004229259 | A | * | 8/2004 |
| JP | 2007-124087 | A | | 5/2007 |
| JP | 2008-228058 | A | | 9/2008 |
| JP | 4386959 | B1 | | 12/2009 |
| JP | 2010050568 | A | * | 3/2010 |
| JP | 2011-223173 | A | | 11/2011 |
| JP | 2016-092798 | A | | 5/2016 |
| JP | 6126054 | B2 | | 5/2017 |

OTHER PUBLICATIONS

Machine translation of JP-2010050568-A obtained from google patents (Year: 2010).*

* cited by examiner

INPUT IMAGE

IMAGE AFTER BLACK CRUSH PROCESSING (GAIN UP IMAGE)

IMAGE AFTER SHARPENING PROCESSING

COMBINED IMAGE

IMAGE PROCESSING METHOD

CROSS-REFERENCE TO RELATED APPLICATIONS

This application is the U.S. National Phase of International Application No. PCT/JP2021/27235, filed Jul. 20, 2021. This application claims priority to Japanese Patent Application No. 2021-009066 filed Jan. 22, 2021, Japanese Patent Application No. 2021-018690 filed Feb. 9, 2021, and Japanese Patent Application No. 2021-064589 filed Apr. 6, 2021. The entire contents of those applications are incorporated by reference herein in their entireties.

TECHNICAL FIELD

The present invention relates to an image processing method to convert a screen that includes both extremely a bright part and a dark part due to indoor window for example or an image that includes a part of extremely low contrast, due to underwater or fog for example, in camera-captured images, into an easy-to-see screen.

The present invention also relates to an image processing method to automatically correct black crush in an input image.

The present invention also relates to an image processing method to combine an image that has been subjected to a sharpening process with an image that has been subjected to the black crush correction processing, wherein the sharpening process converts an image including an extremely low contrast part into an easy-to-see screen.

BACKGROUND ART

As an image processing method to convert a screen including extremely bright parts and dark parts into an easy-to-see screen, Japanese Unexamined Patent Application Publication No. 2002-142150 discloses an image capturing apparatus which includes an image sensor for photoelectrically converting an optical image and outputting an electrical signal, signal processing means for processing the electric signal output from the image sensor to generate a video signal, a histogram circuit for generating a histogram from the video signal output from the signal processing means, and exposure control means for controlling exposure using the histogram detected by the histogram circuit.

Japanese Unexamined Patent Application Publication No. 2003-051944 discloses an image processing method which includes a step of reading light from a document and generating image data, a step of creating a histogram of density distribution from the image data, a step of generating a density correction curve based on the ratio of the number of data proximity to both bright and dark ends of the density distribution to the total number of data in the image data, and a step of correcting the density of the image data using the density correction curve.

Japanese Unexamined Patent Application Publication No. 2007-124087 discloses an image capturing apparatus which includes image capturing means for capturing an image of a subject and obtaining image data of the captured image, and tone correction means for performing tone correction to convert the luminance value of each pixel in a predetermined pixel region in the image of image data captured by the image capturing means so that the luminance intervals between the pixels are increased while keeping the hierarchical relationship between the pixels in terms of relative luminance, wherein the region consists of pixels having a luminance level within a predetermined range.

Japanese Unexamined Patent Application Publication No. 2003-051944 discloses an image processing method which includes a step of reading light from a document and generating image data, a step of creating a histogram of density distribution from the image data, a step of generating a density correction curve based on the ratio of the number of data proximity to both bright and dark ends of the density distribution to the total number of data in the image data, and a step of correcting the density of the image data using the density correction curve.

Japanese Unexamined Patent Application Publication No. 2007-124087 discloses an image capturing apparatus which includes image capturing means for capturing an image of a subject and obtaining image data of the captured image, and tone correction means for performing tone correction to convert the luminance value of each pixel in a predetermined pixel region in the image of image data captured by the image capturing means so that the luminance intervals between the pixels are increased while keeping the hierarchical relationship between the pixels in terms of relative luminance, wherein the region consists of pixels having a luminance level within a predetermined range.

The methods of image processing disclosed in Japanese Unexamined Patent Application Publication No. 2002-142150, Japanese Unexamined Patent Application Publication No. 2003-051944, and Japanese Unexamined Patent Application Publication No. 2007-124087 described above are not applicable to real-time processing of high- or enhanced definition moving images because the processing time becomes long unless a high-capacity computer or device is used.

The present inventor described, in Japanese Patent No. 4386959, a proposal for shortening the processing time and enabling real-time processing of moving images. Japanese Patent No. 4386959 discloses an approach in which image data is captured on a pixel-by-pixel basis in one pass from a captured image, the captured image data is decomposed into a specific color space on a pixel-by-pixel basis to create a histogram of the luminance of the pixels, the information of the pixel luminance is read out with a predetermined reading pattern, and the luminance of the pixel at a specific position (center) in the reading pattern is set based on an average histogram that has excluded the pixel at the specific position in the reading pattern.

Japanese Patent No. 6126054 proposed also by the present inventor discloses an approach in which, in order to improve the contrast of an input signal by locally dividing the input signal to make a tone map and correcting the tone map, in a region subjected to a small change in luminance, the change in luminance is restricted by limiting the gradient when the input luminance signal of the tone map is converted into an output luminance signal so that the output luminance signal does not change beyond a certain level, and further the luminance of the entire region that was reduced by the gradient limitation is adjusted as a whole.

The black crush of an image in which the dark part cannot be visually recognized is a phenomenon seen in an underexposed image or a backlight image. For example, the phenomenon occurs in image capturing during the nighttime with a video camera whose shutter speed cannot be increased by more than $\frac{1}{30}$ second, or when the exposure, gain, and/or aperture are limited by an automatic exposure function when backlit. Such phenomena cannot be avoided due to the structure of general cameras.

Japanese Unexamined Patent Application Publication No. 2011-223173 describes a method of restoring an image captured in a situation where a difference in luminance is large due to backlight for example. Specifically, as described in paragraphs (0038) and (0039), a histogram is created, and when a part of the histogram where the luminance is zero is found to have a value greater than a threshold, the part is determined to have black crush and the brightness of the part is corrected.

Japanese Unexamined Patent Application Publication No. 2002-084449 describes an approach in which a normal imaging mode is switched to an image combination mode when a difference in luminance between a dark part and a bright part of an image becomes large, and in order to correct the black crush and reduce the difference in luminance, a long-exposure image signal and a short exposure image signal region are automatically exposure-controlled.

Japanese Unexamined Patent Application Publication No. 2008-228058 describes an approach in which a long-exposure image signal with a long exposure time and a short-exposure image with a short exposure time are combined, a luminance integrated value and a histogram are generated for the combined image signal, and black crush in the combined image signal is detected from the luminance histogram, and based on the detection result, a target luminance integrated value is set, and the exposure correction control of the image capturing unit is performed using the target luminance integrated value.

Japanese Unexamined Patent Application Publication No. 2016-092798 discloses an imaging device capable of detecting the remaining capacity of a battery. The imaging device includes determination means for displaying a battery segment when the remaining capacity of the battery is low or when the battery is failed. The means determines to display a histogram when the number of pixels with black crush or halation exceed a predetermined value.

BRIEF SUMMARY

According to the method disclosed in Japanese Patent No. 4386959 described above, the processing time is significantly shortened as compared with Patent Documents 1 to 3, and real-time processing of moving images becomes possible.

However, even with the method described in Japanese Patent No. 4386959, there may be a part in an image where the fluctuation in brightness is too large or where noise cannot be removed.

In the approach disclosed in Japanese Patent No. 6126054, a captured image data is read out with a predetermined pattern using Adaptive Histogram Equalization (AHE) or Constract Limited AHE (CLAHE), and the captured image is divided into a plurality of blocks to create a histogram for each small region, so that a tone map for the region is created.

When a tone map is created for each small region in this way, the boundary lines between the small regions are often vaguely visible.

In addition, to create a tone map for each small region, AHE and CLAHE scan an image to create a histogram for each region and then create a tone map, and thereby a large amount of high-speed memory is required for real-time processing, and AHE and CLAHE cannot perform independent processing on a pixel-by-pixel basis, meaning AHE and CLAHE are not appropriate for GPI or FGPA.

In the above-mentioned Japanese Unexamined Patent Application Publication No. 2011-223173, Japanese Unexamined Patent Application Publication No. 2002-084449, Japanese Unexamined Patent Application Publication No. 2008-228058, and Japanese Unexamined Patent Application Publication No. 2016-092798, a histogram of luminance is created, and the histogram is flattened for correction of a backlight part and a shaded part (black crush correction). In order to flatten a histogram, it is necessary to count the histograms of the entire screen, which requires large memory and increases the processing time.

Furthermore, the sharpening process has a problem that the contrast becomes excessive in a dark part, and the black crush correction process tends to cause a lack of contrast in a bright part. However, a process that solves both problems has not been proposed in the prior art yet.

A first aspect of the present invention is based on a premise that image data captured is processed independently on a pixel-by-pixel basis without being divided into small regions. That is, no histogram for each region is created either.

In other words, according to the first aspect of the present invention, n reference pixels are set around a pixel of interest to be scanned in image scanning, in order to process captured image data on a pixel-by-pixel basis, wherein n is an integer, and the pixel value (luminance) of the pixel of interest is compared with the pixel value (luminance) of each of the reference pixels sequentially, the number of the reference pixels whose pixel values are less than or equal to the value of the pixel of interest is counted, and when the luminance comparison with the n reference pixels is completed, the count number is proportionally distributed as an output luminance.

Also, according to the first aspect of the present invention, in order to process captured image data on a pixel-by-pixel basis, n reference pixels are set around a pixel of interest to be scanned in image scanning, wherein n is an integer, and the pixel value (luminance) of the pixel of interest is compared with the pixel value (luminance) of each of the reference pixels sequentially. Next, the number of the reference pixels is counted whose pixel value is less than or equal to the value of the pixel of interest and also whose histogram value, when compared after incremented by 1, is less than or equal to a preset inclination limit value, so that the count number considering the inclination limit can be obtained to output.

The first aspect of the present invention provides the same result as in the case of creating a tone map by executing a logic execution, without actually using large memory to create a histogram and a tone map for each region as in the prior art.

In order to correct the brightness of the darkened image due to the inclination limit in the above-mentioned image processing method, the number of the reference pixels that were not counted in the comparison with the inclination limit value is counted, and the non-count number of the reference pixels is added as an offset value to the output.

In order to automatically calculate the fixed offset value for each region, the average of the values of the reference pixels is calculated, and the number of the reference pixels that were not counted in comparison with the inclination limit value is counted. As a result, the average of the values of the reference pixels and the number of the non-counted reference pixels can be considered in the output.

In order to increase the overall contrast of the image processed as described above, the number of the reference pixels that were not counted in comparison with the inclination limit value is counted. As a result, the number of the non-counted reference pixels can be considered in the output.

Furthermore, in order to increase the overall brightness and contrast, the average of the values of the reference pixels is calculated, and the number of the reference pixels that were not counted in comparison with the inclination limit value is counted. As a result, the average and the number of the non-counted reference pixels can be considered in output.

In addition, when an image is dark overall and the pixel values are biased to 0, the entire screen may become whitish. In order to solve this problem, the value of the pixel of interest is compared with the value of each of the reference pixels. Then, the number of the reference pixels having a pixel value equal to the value of the pixel of interest and the number of the reference pixels having a pixel value less than the value of the pixel of interest are individually counted, and the former count number is added to the latter count number in proportion to the value of the pixel of interest, so as to average. As a result, these numbers can be considered in output.

A second aspect of the present invention is based on a premise that an input image is processed independently on a pixel-by-pixel basis without being divided into small regions. That is, the luminance distribution information is obtained from the image data without creating a histogram for each region, and the luminance only in a dark part is adjusted in accordance with the darkness.

In other words, according to the second aspect of the present invention, a Blur plane with blurred luminance is created from a Y plane (luminance plane) of an input image, a dark part of the Blur plane is corrected, and the input image is divided by the corrected Blur plane.

According to the second aspect of the present invention, a Gaussian blur value (Blur value) of luminance is calculated by referring to the surroundings of a pixel of interest without creating a flat frame as a frame buffer (memory), a level conversion (correction of distribution information) is performed on a pixel-by-pixel basis, and the pixel of interest is divided by the level conversion value.

More specifically, a Blur value with blurred luminance is obtained by performing Gaussian Blur processing on the luminance of each pixel in the Y plane (luminance plane) memory of an input image, so that the Blur value is normalized according to the bit depth to obtain distribution information having values from 0 to 1.0. Then, a threshold is set between the normalized values of 0 to 1.0. All of the pixels having a value larger than the threshold are set to 1.0. For the pixels having values smaller than the threshold in a dark part in the image, the luminance magnification (n) of the darkest pixel is determined. The distribution information is then corrected such that the reciprocal of the luminance magnification (1/n) becomes the lowest value of the distribution information, and the luminance of the input image is divided by the corrected luminance distribution information (1/n to 1.0) of the dark part.

In the above processing, the processing for calculating the Blur value and the processing for correcting the luminance distribution information are performed in parallel, resulting in the reduction of delay.

In using line buffers (FPGA), the parallel processing is possible at the stage when level conversion (correction of distribution information) is completed for the number of lines corresponding to the diameter of the Gaussian filter, while in using a kernel filter (GPU, CPU), the above-described flow itself can be implemented, enabling an output immediately after the calculation with the kernel filter is completed.

In the present invention, luminance distribution information is obtained from image data without scanning an image to create a histogram, and the luminance of only the dark part is adjusted in accordance with the darkness. Accordingly, the processing speed is greatly increased, enabling a corrected image to be displayed in real time.

The second aspect of the present invention provides the same result as in the case of creating a histogram and a tone map by executing a logic execution, without actually using large memory to create a histogram and a tone map for each region as in the prior art.

No memory for histograms and tone maps is required, and only the line buffers are necessary to enable the implementation. Delay is caused only by the line buffers, and also no full-screen statistics such as histogram acquisition is necessary, resulting in no delay in units of frames.

Since the logic itself is simple and can be mounted in an empty area of a small FPGA or other video circuits, and since there is no logic or memory whose size is proportional to the pixel depth (number of bits) such as a histogram array, the circuit size is almost the same for a high bit depth, for example 36 bits or 48 bits.

Correction can be performed on a single image without referencing previous and precedent frames, and the saturation can be emphasized by processing RGB individually.

An image processing method according to a third aspect of the present invention relates to a method in which an image that has been subjected to a sharpening process is combined with an image that has been subjected to the black crush correction processing. Using the principle of a flat frame for the black crush processing, the ratio of the black crush processing is increased in the dark parts of the image, and the ratio of the sharpening processing is increased in the bright parts.

In an example of the sharpening process, in order to process captured image data on a pixel-by-pixel basis, n reference pixels, n being an integer, are set around a pixel of interest to be scanned in image scanning, and the pixel value (luminance) of the pixel of interest is compared with the pixel value (luminance) each reference pixel sequentially. Next, the number of the reference pixels is counted whose pixel value is less than or equal to the value of the pixel of interest. In parallel with the counting, the histogram value of each of the reference pixels is incremented by 1 to be compared with an inclination limit value. As such, the number of the reference pixels is counted that satisfy both the condition that the value is less than or equal to the value of the pixel of interest and the condition that the histogram value is less than or equal to the inclination limit value, so as to obtain a count value of reference pixels that are true in both of the conditions and proportionally distribute the true-in-both count value, in output.

In an example of the black crush processing, a Blur value with blurred luminance is obtained by performing Gaussian Blur processing on the luminance of each pixel in the Y plane (luminance plane) memory of an input image, so that the Blur value is normalized to obtain distribution information having values from 0 to 1.0. Then, a threshold is set between the normalized values of 0 to 1.0. All the pixels having values larger than the threshold are set to 1.0. For the pixels having values smaller than the threshold in a dark part in the image, the luminance magnification (n) of the darkest pixel is determined. The distribution information is then corrected such that the reciprocal of the luminance magnification (1/n) becomes the lowest value of the distribution information, and the luminance of the input image is divided by the corrected luminance distribution information (1/n to 1.0) of the dark part.

According to the first aspect of the present invention, it is possible to simultaneously solve the problems that remain unsolved even by the sharpening process and the black crush correction process.

The first aspect of the present invention is based on a premise that image data captured is processed independently on a pixel-by-pixel basis without being divided into small regions. That is, no histogram for each region is created either. Accordingly, the processing speed is greatly increased, and the corrected image can be displayed in real time.

The first aspect of the present invention provides the same result as in the case of creating a histogram and a tone map by executing a logic execution, without actually using large memory to create a histogram and a tone map for each region as in the prior art.

No memory for histograms and tone maps is required, and only the line buffers are necessary to enable the implementation. Delay is caused only by the line buffers, and also no full-screen statistics such as histogram acquisition is necessary, resulting in no delay in units of frames.

Since the logic itself is simple and can be mounted in an empty area of a small FPGA or other video circuits, and since there is no logic or memory whose size is proportional to the pixel depth (number of bits) such as a histogram array, the circuit size is almost the same for a high bit depth, for example, 36 bits or 48 bits.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
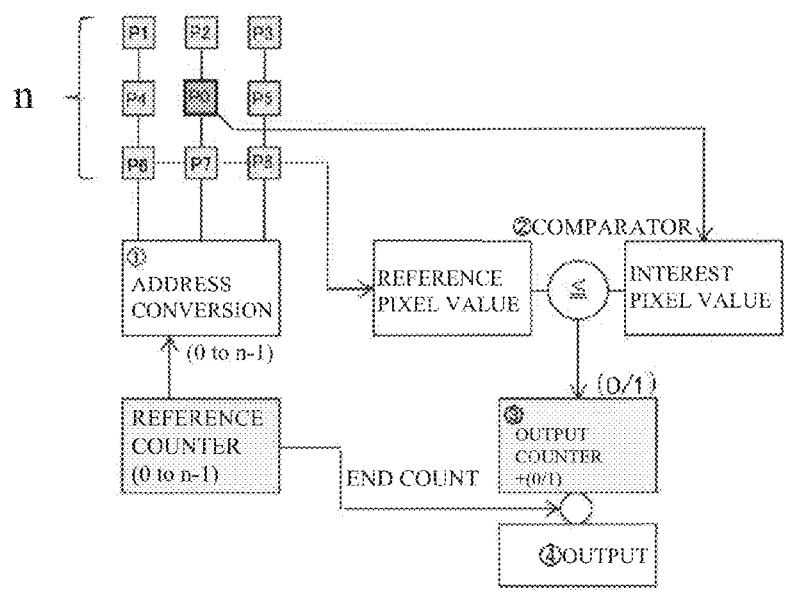
FIG. 1 is a diagram illustrating the basics of a logical image processing method according to the first aspect of the present invention.
Figure 2:
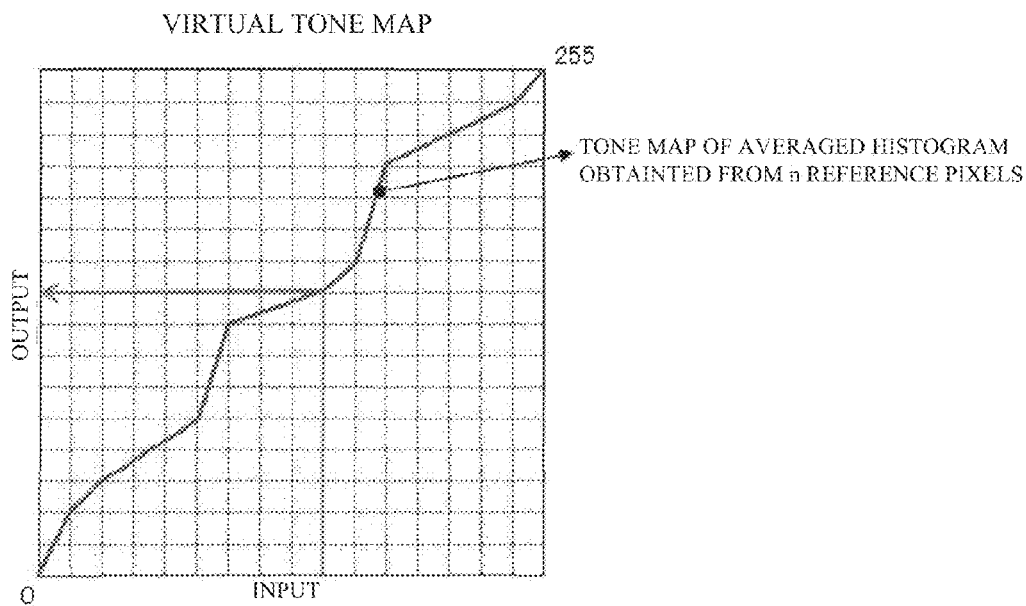
FIG. 2 is a virtual tone map that averaged the histograms of reference pixels corresponding to FIG. 1.

FIG. 1 is a diagram illustrating an implementation of a logical image processing method according to the first aspect of the present invention. In the figure, the mark P0 shows a pixel of interest, and the brightness (luminance) of the pixel of interest P0 is to be adjusted. FIG. 2 shows a virtual tone map in which the execution results obtained from the reference pixels (eight in P1 to P8 in FIG. 1) when processed by the method of FIG. 1 are graphed at all the brightness the reference pixels can have.

The first aspect of the present invention is directed to obtain only one conversion result for the pixel of interest from the pixel of interest and the reference pixels, and not to output a tone map.

The processing procedure is as follows. First, the luminance of the pixel of interest P0 and those of the reference pixels P1 to P8 around it are compared, the number of the reference pixels having a luminance smaller than the luminance of the pixel of interest P0 is counted. Then, the luminance of the pixel of interest P0 is corrected in accordance with the resulting count value by a predetermined algorithm.

For example, when the number of the reference pixels having a luminance smaller than the luminance of the pixel of interest P0 is 1 and the number of the reference pixels having a luminance larger than the luminance of the P0 is 7, the luminance value of each of the reference pixels is corrected to ⅛ of that, with the maximum luminance to be output being set to 1. Note that the correction algorithm is not limited to this one.

When the above processing is implemented on an FPGA or CPU, the pixel of interest is moved one by one in the row direction, and the processing is performed in parallel for each row, so as to correct the luminance of all the pixels and smooth the brightness.

When the above processing is implemented on a GPU, since the operations are independently implemented on each pixel, the processing is performed in parallel on multiple cores simultaneously, so as to correct the luminance of all the pixels and smooth the brightness.

Note that the virtual tone map of FIG. 2 is not actually generated by the algorithm and shows an execution result of the logic for the entire input luminance for better understanding.

There is room for improvement in the above implementation example. Specifically, the virtual tone map of FIG. 2 includes three points where the output suddenly increases with respect to the input, more specifically, where the inclination angle is 45° or more. These points represent where the brightness prominently increases, due to noise for example.

Figure 3:
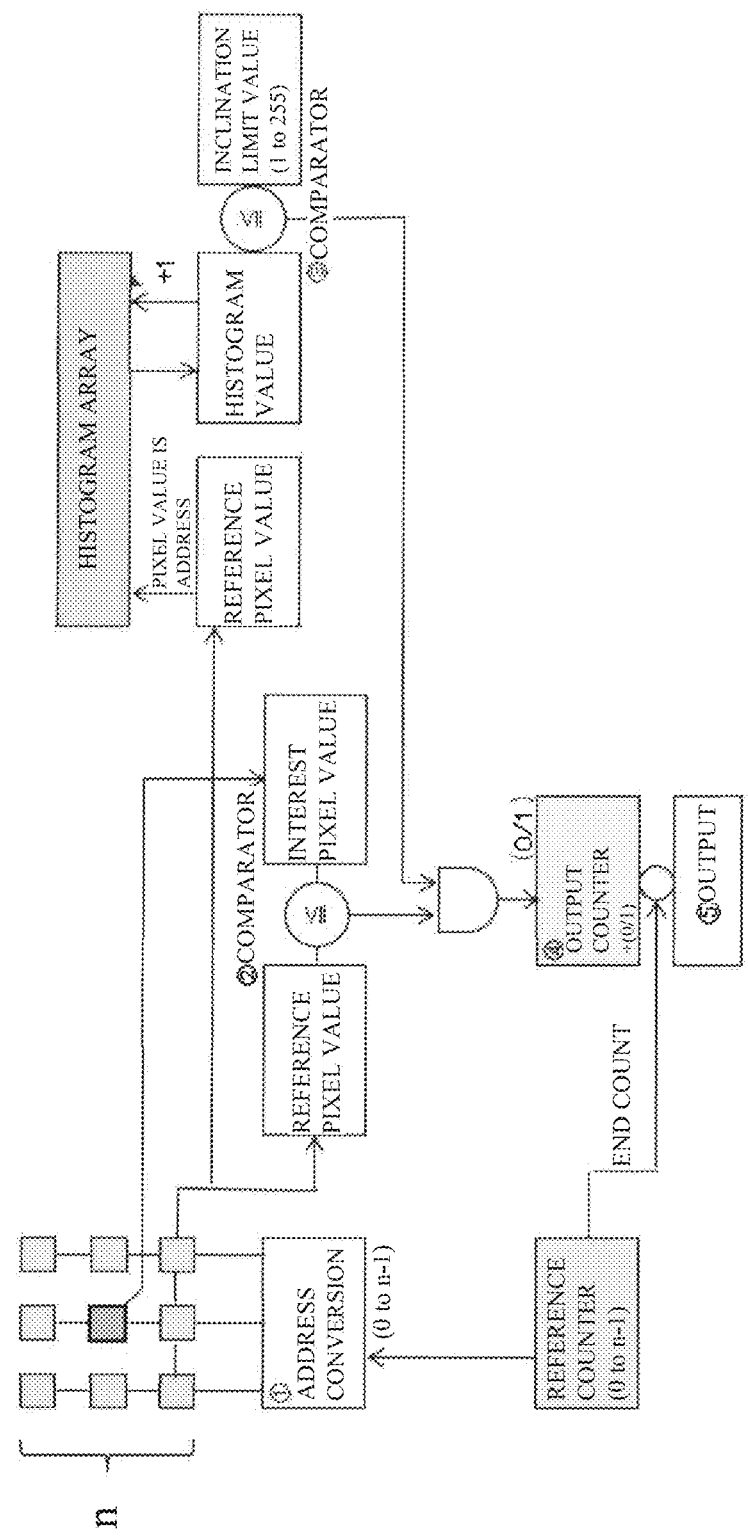
FIG. 3 is a diagram showing an implementation example of the image processing method according to the first aspect of the present invention.
Figure 4:
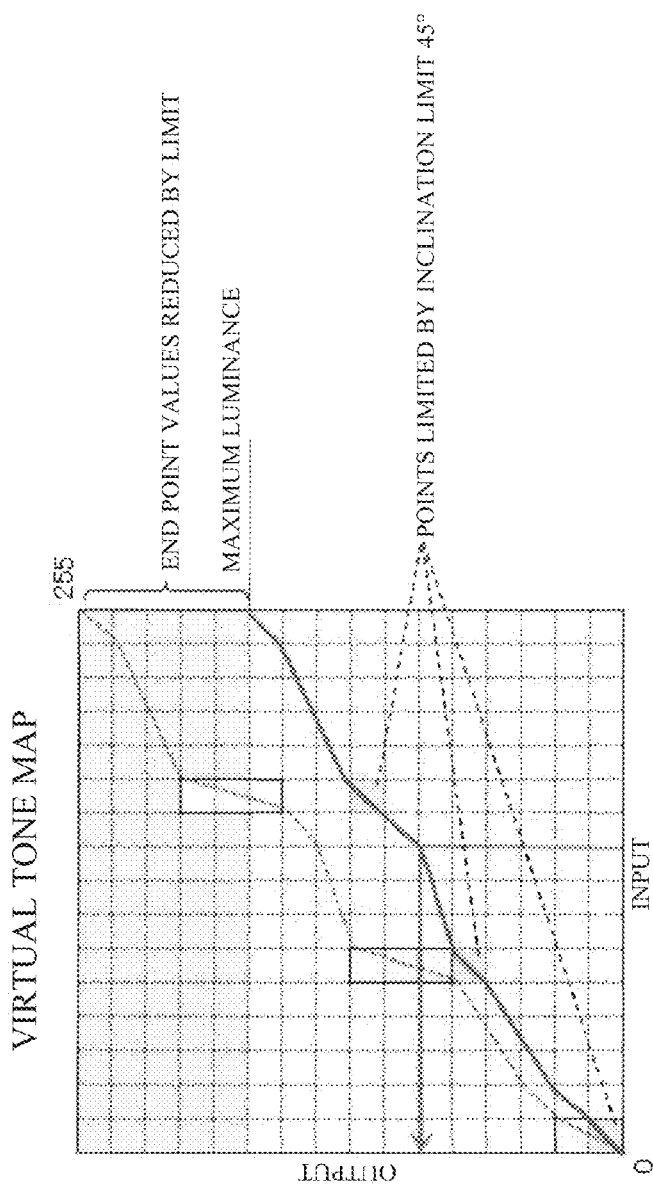
FIG. 4 is a virtual tone map corresponding to FIG. 3.

FIG. 3 is a diagram showing an implementation example in which the above processing is improved, FIG. 4 is a virtual tone map corresponding to FIG. 3, and the dotted line in FIG. 4 is a virtual tone map when the logic of FIG. 2 is executed.

In order to eliminate such a part where the brightness is prominent, the pixel values (luminance) of reference pixels P1 to P8 are sequentially compared with the pixel value of the pixel of interest P0 to determine whether or not they are equal to or less than the pixel value of the pixel of interest P0.

In parallel with the above processing, the histogram value of each of the reference pixels is incremented by 1 and compared with the inclination limit value (45°) to determine whether it is equal to or less than the inclination limit value.

Then, the number of the reference pixels satisfying both of the above two determinations is counted as a true-in-both count value, and the brightness of the pixel of interest is output based on the true-in-both count value.

After the above processing, as shown by the solid line in FIG. 4, an easy-to-see image without a part where the brightness prominently changes can be obtained.

The inclination limit was taken into consideration in the above processing, by counting the number of the reference pixels having a pixel value equal to or less than the value of the pixel of interest, comparing the histogram value of each of the reference pixels that was incremented by 1 with a preset inclination limit value, counting the number of reference pixel having the histogram value less than or equal to the inclination limit value, and counting the number of the reference pixels that are true in both as a true-in-both count value.

Under this condition, however, the entire image may be darkened. A configuration for correcting the darkness is shown in the virtual tone maps of FIGS. 5 and 6.

Figure 5:
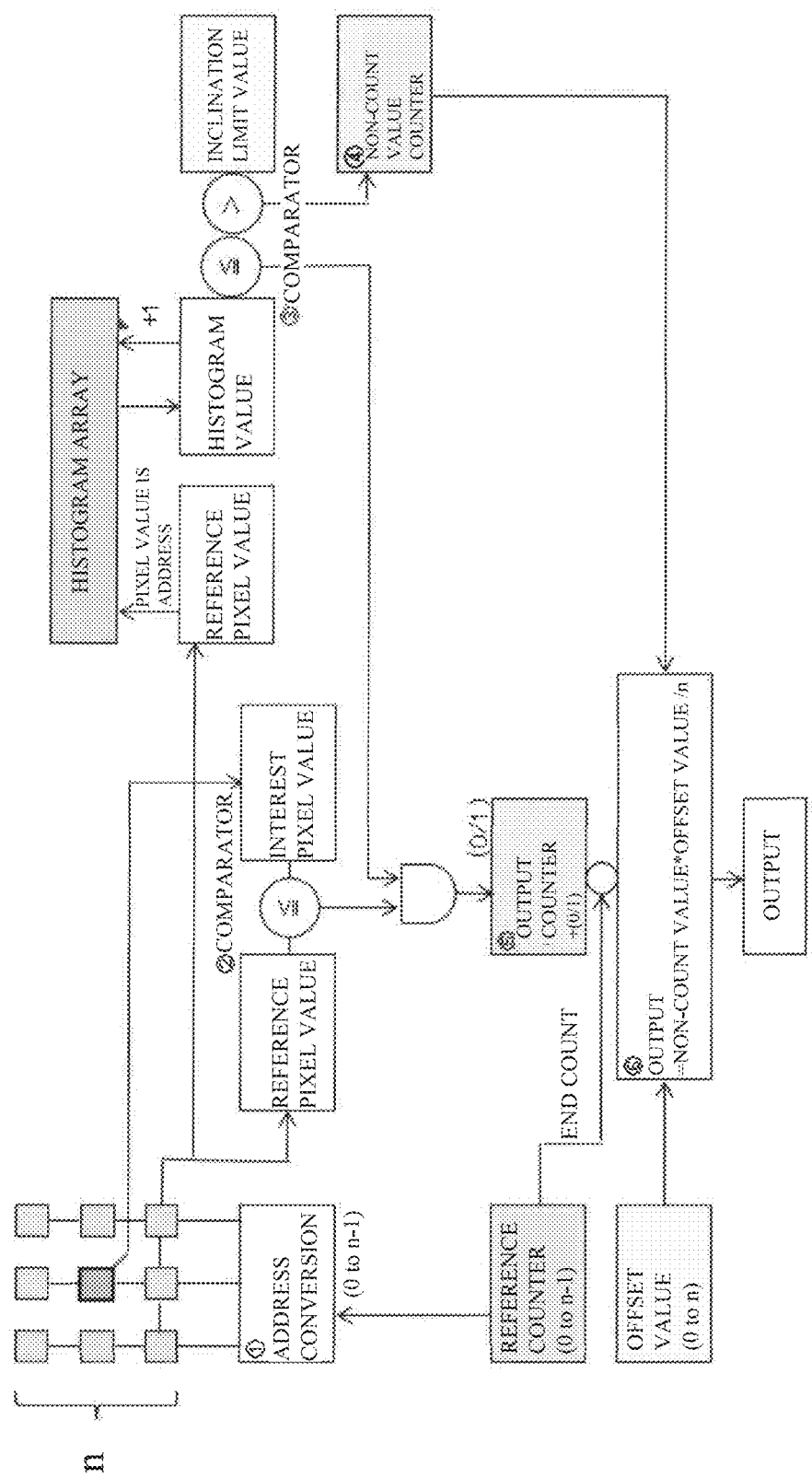
FIG. 5 is a diagram showing another implementation example of the image processing method according to the first aspect of the present invention.

In the implementation example shown in FIG. 5, the number of the reference pixels satisfying both the conditions of being equal to or less than the pixel value of the pixel of interest P0 and being equal to or less than the inclination limit value is set as a true-in-both count value, and further, the number of the reference pixels (a non-count value) is counted that have a histogram value larger than the inclination limit value, so that an offset value of luminance is set as an external parameter of a value from 0 to n, and the above true-in-both count value is added by (non-count value×offset value/n) for output.

Here, the offset value is determined by what percentage of the brightness (a+b) of the end point value that was reduced by the inclination limit is raised.

$$\text{Output} = \text{True-in-both Count value} + (\text{Non-Count value} \times \text{Offset Value}/n)$$

where n is the number of the reference pixels, for example, 128 or 256, and the offset value is from 0 to n.

Figure 6:
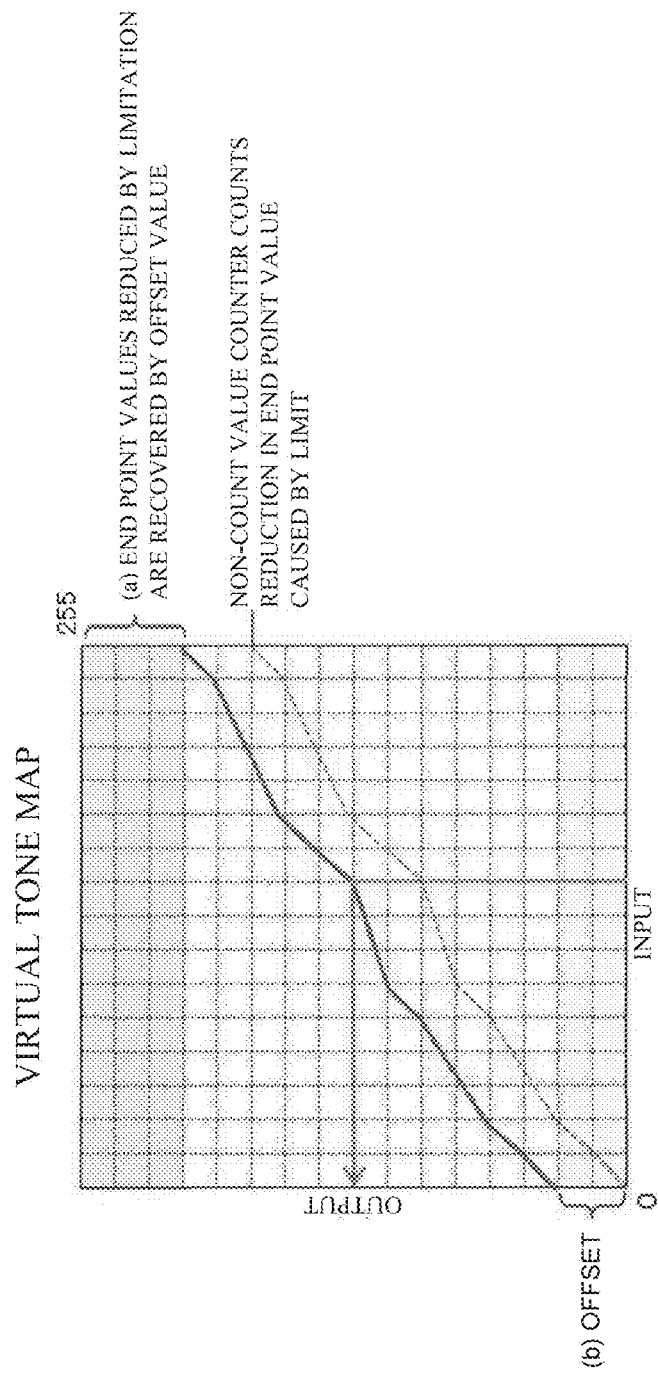
FIG. 6 is a virtual tone map corresponding to FIG. 5.

As a result of the above processing, as shown in FIG. 6, no change occurs in the virtual tone map characteristics of the image, but the entire image becomes brighter by the offset value.

Figure 7:
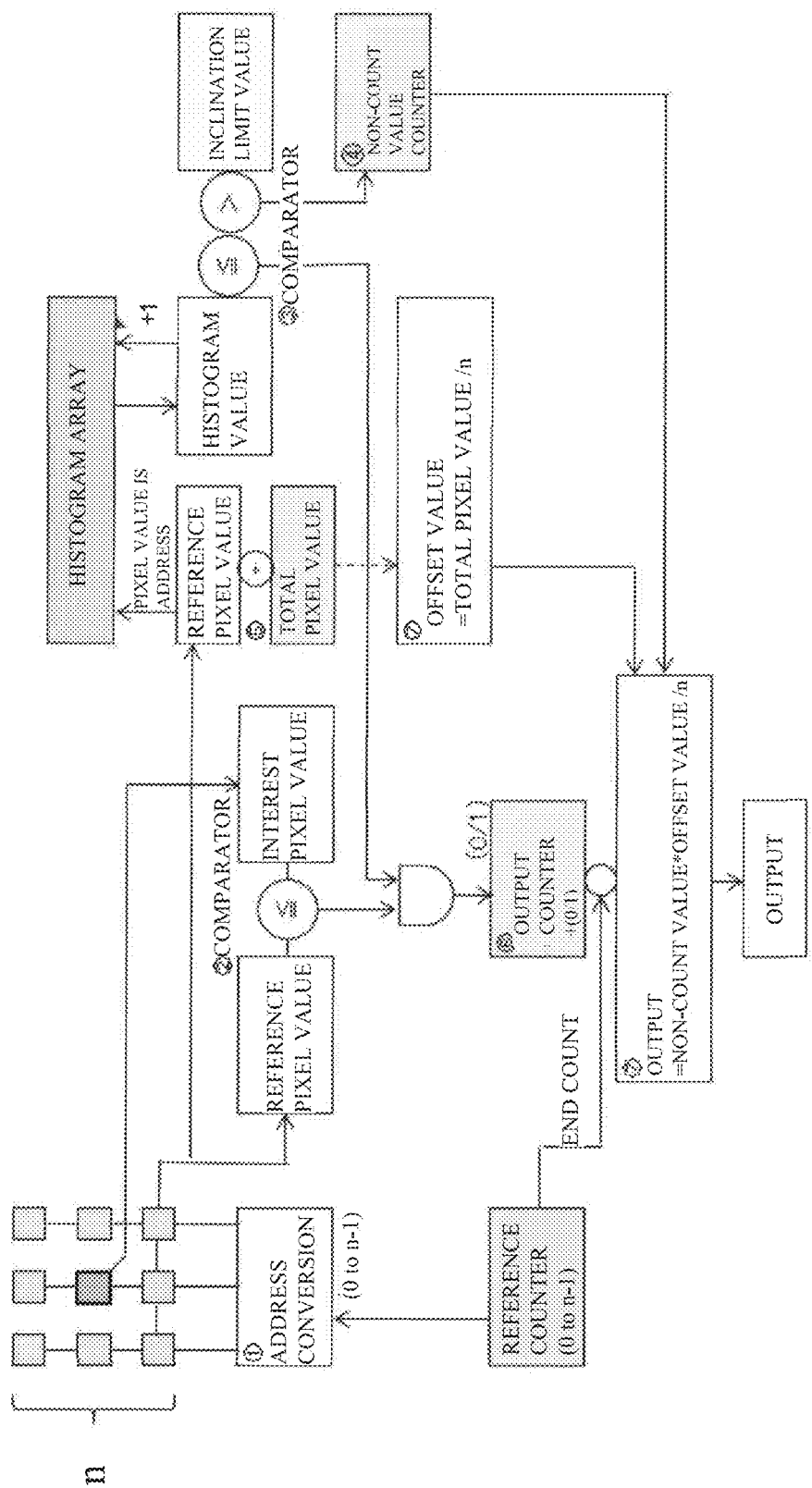
FIG. 7 is a diagram showing another implementation example of the image processing method according to the first aspect of the present invention.

FIG. 7 is an example showing an implementation example in which the above-mentioned offset value is automatically calculated for each region. In this implementation example, the read-out values of the reference pixels and the value of the pixel of interest are compared, the histogram value of each of the reference pixels is incremented by 1 and compared with a preset inclination limit value, and the number of the reference pixels that have a histogram larger than the inclination limit value is counted as a non-count value.

In parallel with the above processing, the values of the reference pixels less than or equal to the preset inclination limit value are simply summed up and divided by the number of the reference pixels to calculate the average value. The resulting average value is divided by the maximum luminance of the pixel (256 for 8 bits) to be proportionally distributed between 0 and n to obtain an offset value. That is, by using the average luminance itself of the reference pixels as the offset value, the luminance of the pixel of interest P0 can be matched with the luminance around it.

Then, as shown below, the (non-count value×offset value/n) is added to the true-in-both count value for output.

$$\text{Output} = \text{True-in-both Count value} + (\text{Non-Count value} \times \text{Offset Value}/n)$$

Figure 8:
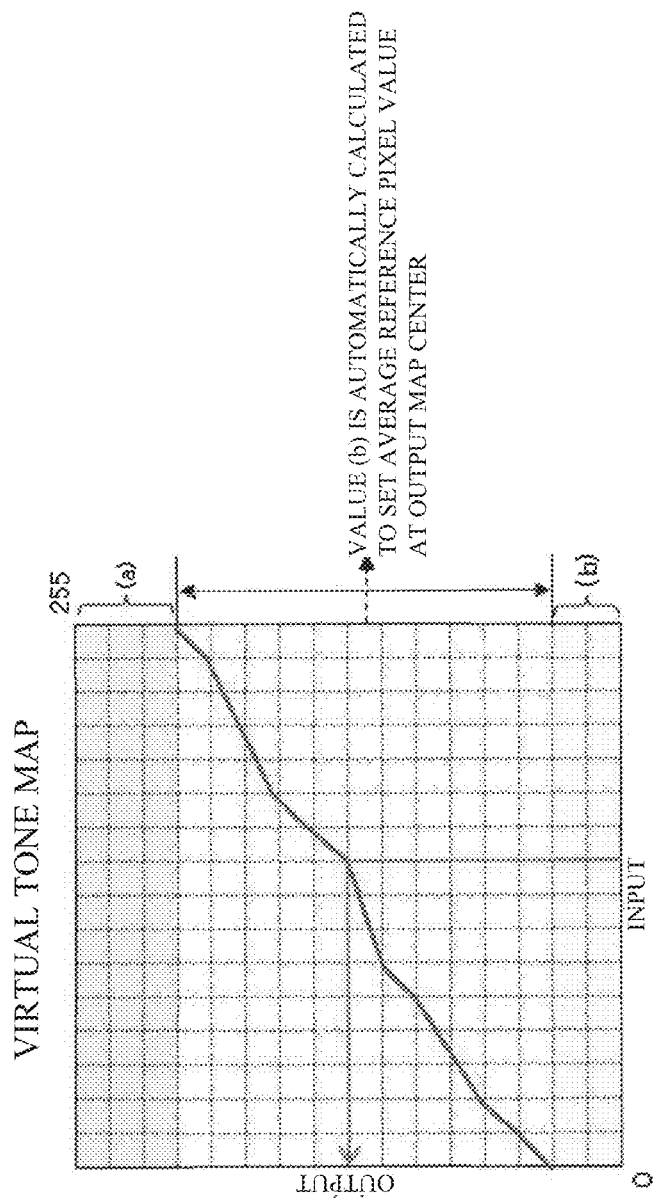
FIG. 8 is a virtual tone map corresponding to FIG. 7.

FIG. 8 is a virtual tone map obtained by the above processing. In this implementation example, by using the average luminance of the reference pixels as an offset value, a tone map can be automatically created where the brightness of the pixel of interest matches with those around it.

Figure 9:
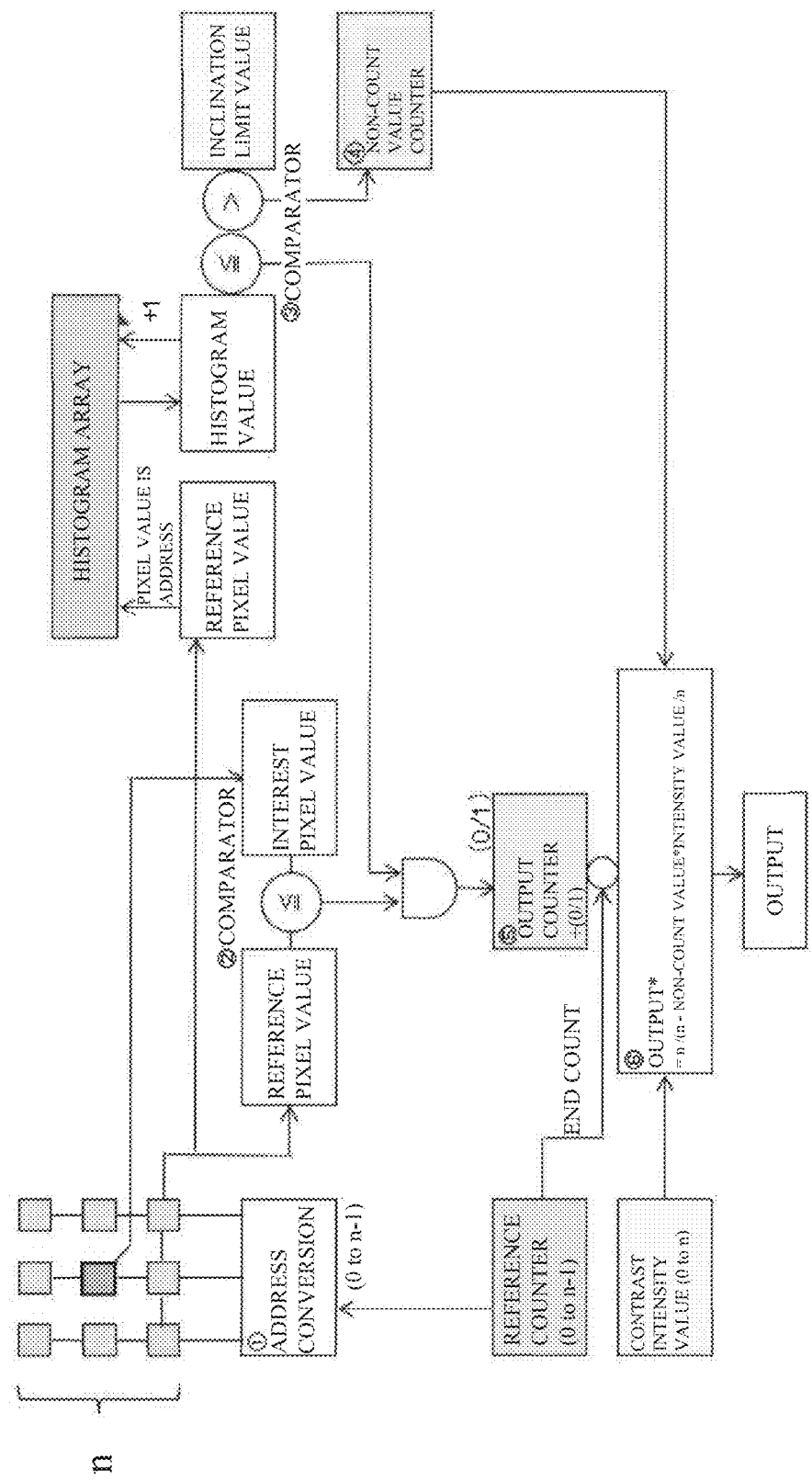
FIG. 9 is a diagram showing another implementation example of the image processing method according to the first aspect of the present invention.

Through the above-mentioned image processing, the part where the brightness is extremely eminent from the surroundings is eliminated, and also the entire image is not darkened, but still the contrast of the entire image may be insufficient. An implementation example for solving this problem is shown in FIG. 9.

In this implementation example, the number of the reference pixels satisfying both the conditions of being less than or equal to the pixel value of the pixel of interest P0 and being less than or equal to the inclination limit value is set as a true-in-both count value, and furthermore, the number of the reference pixels (a non-count value) having a histogram larger than the inclination limit value is counted.

Then, the contrast intensity values are set as external parameters having a value from 0 to n, and the true-in-both count value is multiplied by {n/(n−Non-Count value×Intensity Value/n)}, to output the luminance of pixel of interest P0.

Output=True-in-both Count value×n/(n−Non-Count value×Intensity Value/n)

where n is the number of the reference pixels, for example, 128 or 256, and the intensity value is from 0 to n.

Figure 10:
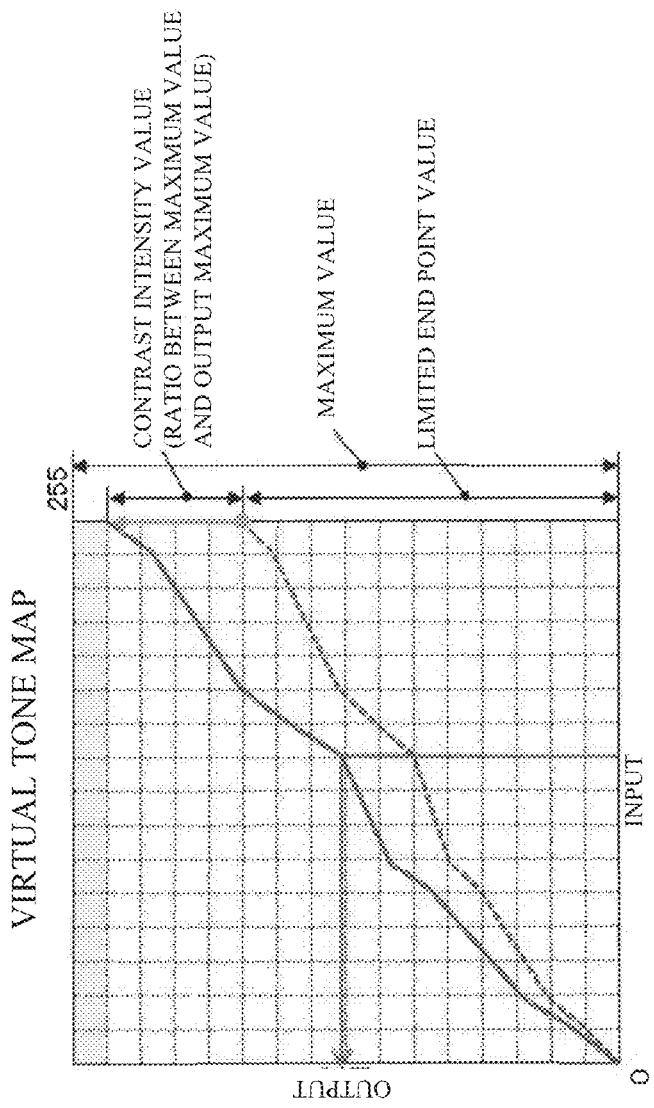
FIG. 10 is a virtual tone map corresponding to FIG. 9.

FIG. 10 shows a virtual tone map of the image obtained by the above processing. In the above-mentioned implementation example, the end point value (maximum luminance) reduced by the inclination limit is uniformly raised by the offset value. The present implementation example, however, includes multiplication processing, also resulting in changing of the inclination.

Figure 11:
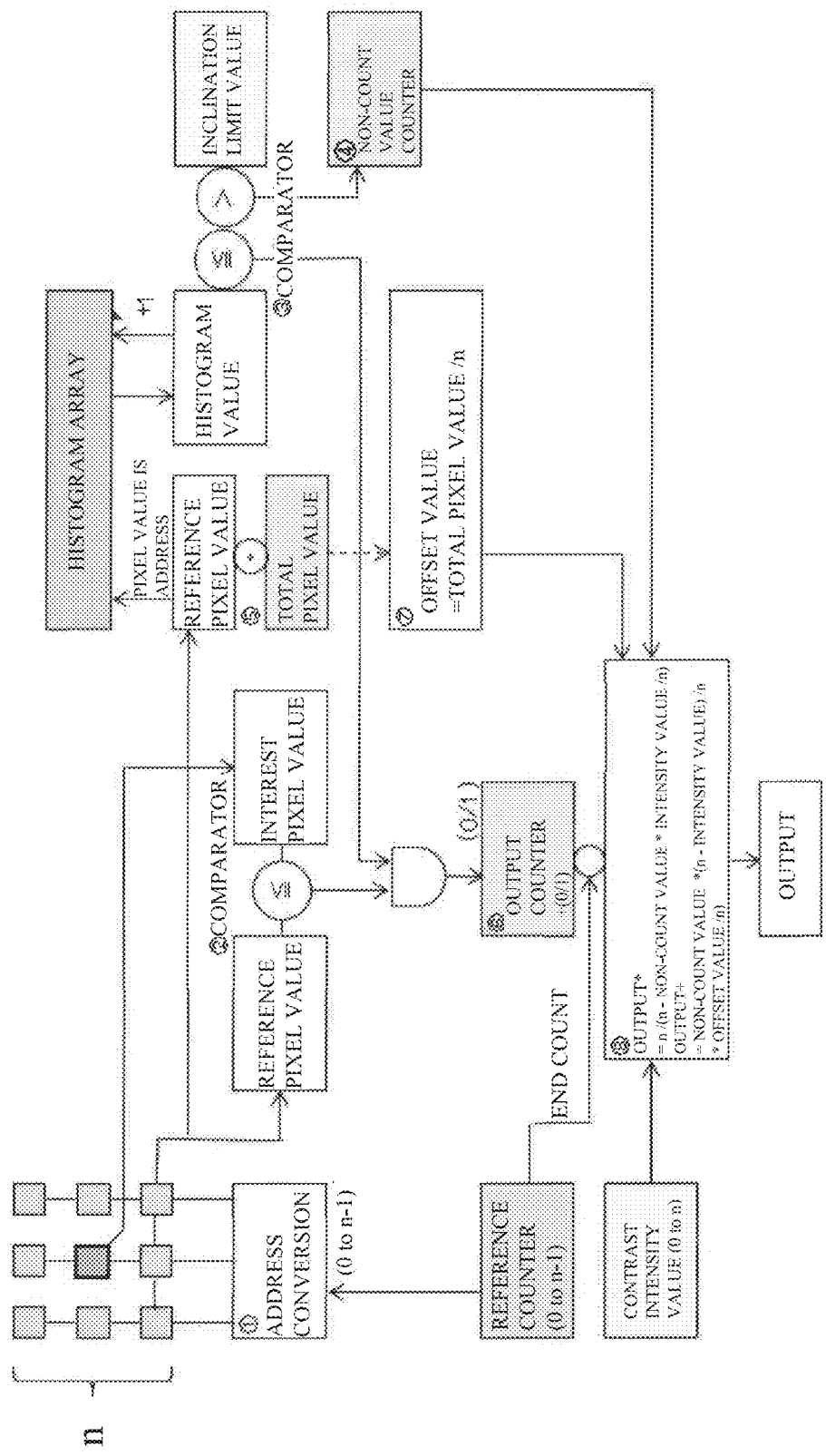
FIG. 11 is a diagram showing another implementation example of the image processing method according to the first aspect of the present invention.
Figure 12:
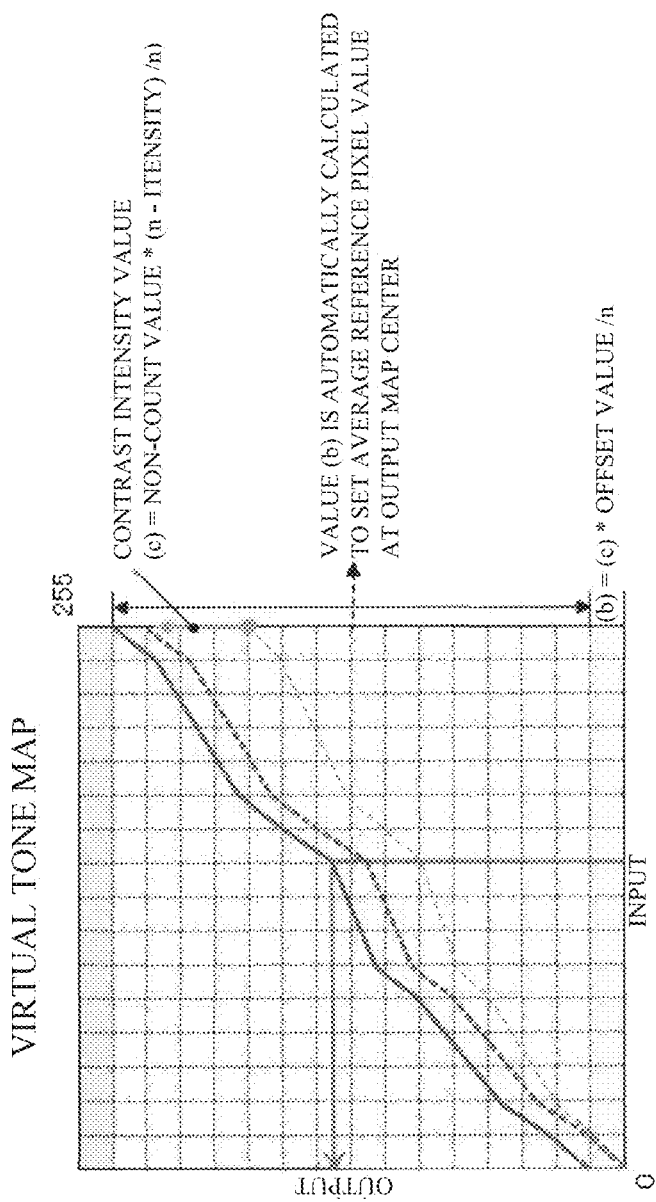
FIG. 12 is a virtual tone map corresponding to FIG. 11.

FIG. 11 shows an implementation example in which the offset function and the contrast function are simultaneously exhibited. In this implementation example, the number of the reference pixels satisfying both the conditions of being less than or equal to the pixel value of the pixel of interest P0 and being less than or equal to the inclination limit value is set as a true-in-both count value, and simultaneously the values of the reference pixels less than or equal to the preset inclination limit value are simply summed up and divided by the number of the reference pixels to calculate the average value, which is set as an offset value.

Then, the true-in-both count value is multiplied by {n/(n−non-count×intensity value/n)} and added by {non-count value×(n−intensity value)/n×offset value/n} to output. That is, the following equation is used:

Output=True-in-both Count value×{n/(n−Non-Count value×Intensity Value/n)}+{Non-Count value× (n−Intensity Value)/n×Offset Value/n} where n is the number of the reference pixels, for example, 128 or 256, and the offset value and the intensity value are from 0 to n.

Through each above-described processing, the part whose brightness is extremely different (for example, due to noise) from the surroundings is eliminated, and the contrast of the entire image can be corrected. However, such processing tends to cause a bias to specific luminance in a region that is mostly constituted by pixels of the same value. For example, if the pixel values are biased to 0 in a dark image, a problem that the image becomes whitish arises.

Figure 13:
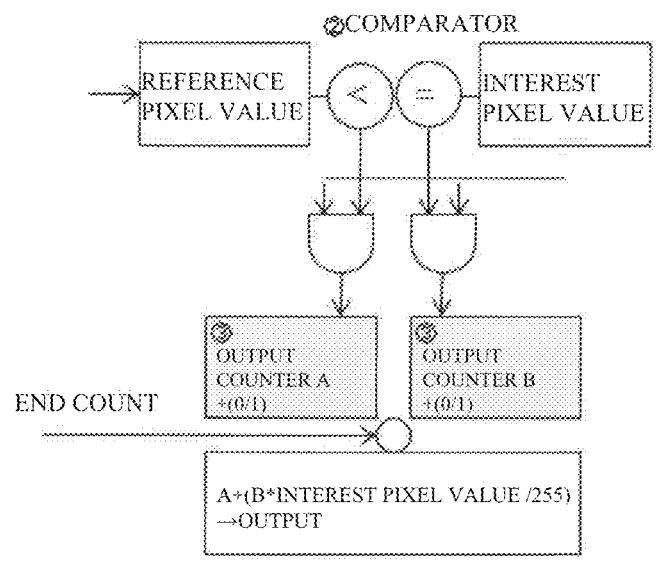
FIG. 13 is a diagram showing another implementation example of the image processing method according to the first aspect of the present invention.

FIG. 13 is a diagram obtained by further improving the parts shown in FIG. 3. In this implementation example, two comparators for comparing the values of the reference pixels and the value of the pixel of interest are prepared, so that the number of the reference pixels having a luminance less than the value of the pixel of interest and being equal to or less than the inclination limit value and the number of the reference pixels having a luminance equal to the value of the pixel of interest and being equal to or less than the inclination limit are individually counted.

The resulting count number of the reference pixels having a luminance equal to the value of the pixel of interest is proportionally added to the resulting count number of the reference pixels having a luminance less than the value of the pixel of interest in accordance with the luminance of interest.

Figure 14:
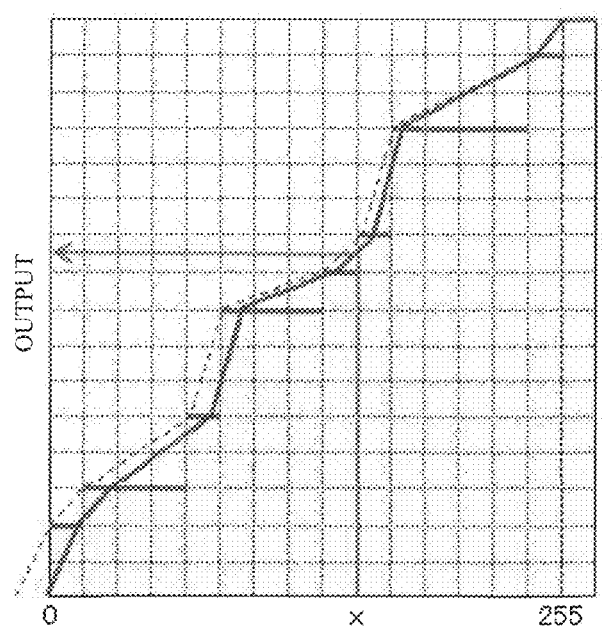
FIG. 14 is a virtual tone map corresponding to FIG. 13.

As shown in FIG. 14, the addition processing provides a tone map where the end point (maximum luminance) is fixed, and the start point is moved to the origin (0, 0).

Figure 15:
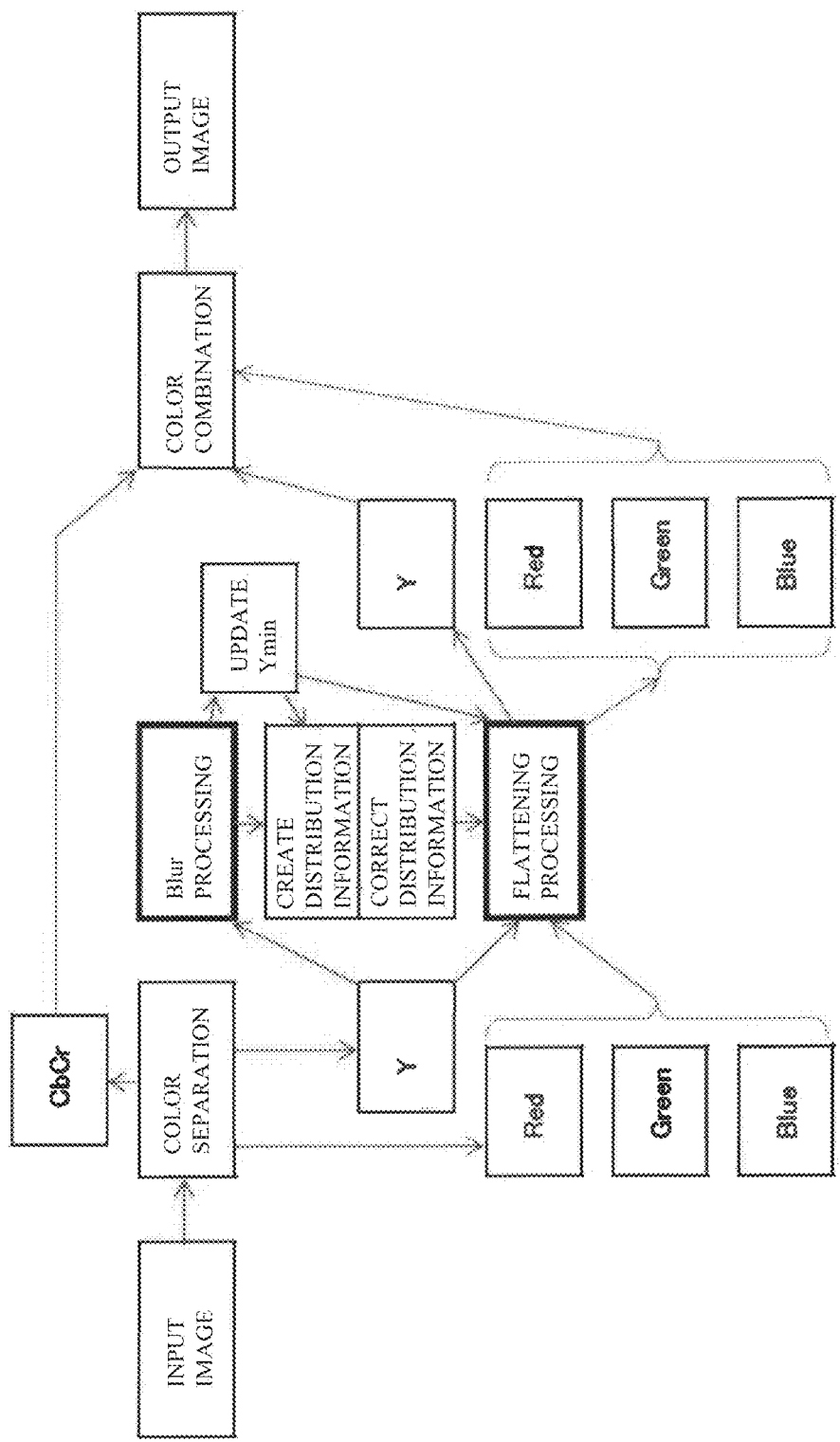
FIG. 15 is a diagram illustrating the basics of a logical image processing method according to the second aspect of the present invention.

In the second aspect of the present invention, as shown in FIG. 15, an input image is color-separated, and the hue (CbCr), the luminance (Y) and the three primary colors (RGB) are extracted. In the present invention, the luminance (Y) is subjected to Blur processing and flat correction and combined with the hue (CbCr) and the three primary colors (RGB) to obtain an output image. Note that, in the present invention, a flat frame (an image having uniformized luminance) is not created, but only the principle of the flat frame is used.

In the Blur processing, an image in which luminance is roughly variable, that is, an image with blurred luminance is created. In the present example, Gaussian Blur processing was performed to blur the image using a Gaussian function.

Figure 16A:
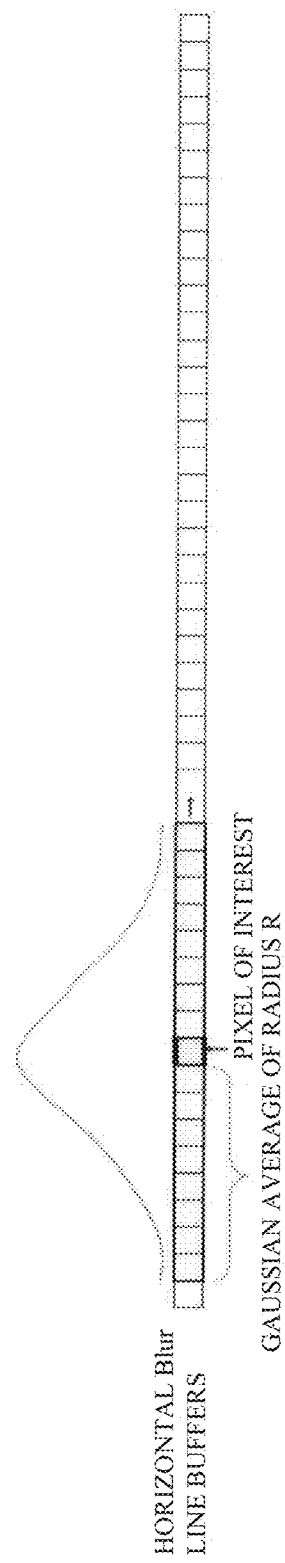
FIG. 16A is a diagram illustrating horizontal Blur processing.
Figure 16B:
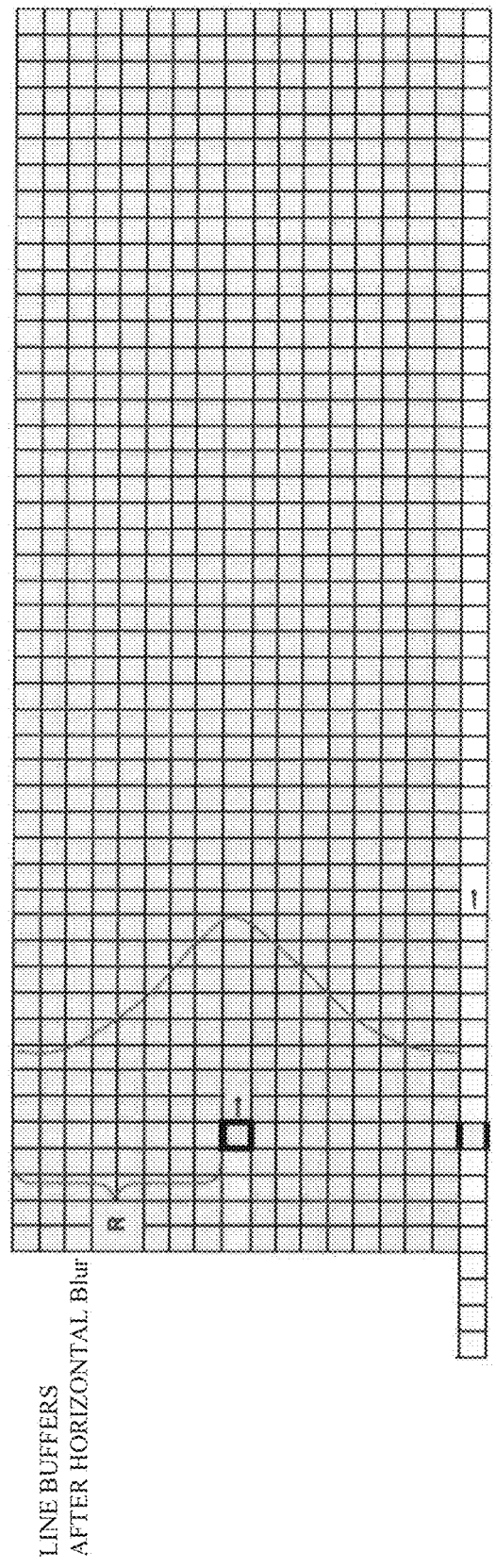
FIG. 16B is a diagram illustrating vertical Blur processing.

In the Gaussian Blur processing, for example, the horizontal Blur processing shown in FIG. 16A is performed, and the vertical Blur processing shown in FIG. 16B is performed on the line buffers after the horizontal Blur processing so as to create a blur plane.

In the horizontal Blur processing, the minimum value (Ymin) of the input video image is calculated by averaging the 4 frames, in the past, having the minimum value in the input image.

In addition, while the Gaussian Blur processing is performed, the minimum value (Bmin) and the maximum value (Bmax) of the Blur image are calculated.

In implementing the logic of the present invention, a Gaussian table with radius R is used, and no Gaussian calculation is used. The radius R is 30 pixels at the maximum, and 62 line buffers (30×2+1 at the center+1 for horizontal calculation) are used.

In the illustrated example, for the kernel size of 61×61, the Gaussian Blur processing is divided into horizontal Blur and vertical Blur in order to reduce the regions to process, but a kernel filter may be simply used without dividing.

After creating a Blur plane by the above Gaussian Blur processing, the Blur plane is corrected. The Blur plane here is not a flat frame, but a line buffer of enumerated Blur values.

First, the Blur plane is normalized to obtain distribution information having values from 0 to 1.0, then a threshold is set between the normalized values 0 to 1.0. All the pixels having values larger than the threshold are set to 1.0. For the pixels with values smaller than the threshold in a dark part, the luminance magnification (n) of the darkest pixel is determined, and the distribution information is corrected such that the reciprocal of the luminance magnification (1/n) becomes the lowest value of the distribution information.

For example, if the threshold is set to 0.5, among the normalized values 0 to 1.0, the values from 0 to 0.5 fall in a range of 0 to 1.0, and the values of 0.5 or more all become 1.0.

The above corrections allow the pixels with a luminance of 0.5 or more in the input image to have a value of 1.0 in the distribution information and not to change from the original image in later processing (the input image is divided by the luminance distribution information, the denominator). On the other hand, since the denominator gradually becomes smaller in a dark part, the dark part is corrected such that the darker the original image, the higher the magnification.

The Blur plane correction (correction of distribution information) is followed by flattening processing. In the flattening processing, a current frame is processed based on the Blur plane and the minimum value (Ymin) of input video image. That is, in the flattening processing, the luminance (Y) and the three primary colors (RGB) of the input image are divided by the Blur plane.

In the above processing, the vertical Blur value of the pixel of interest is determined, which enables the processing from the creation of a Blur plane to the acquisition and correction of distribution information. Accordingly, real-time processing can be performed with only the delay for the line buffers, without using a frame buffer.

The flattening processing includes normal processing and color burst processing. In normal processing, only the luminance (Y) is processed and combined with the hue (CbCr) for output. In the color burst processing, the same calculation is performed for the three primary color (RGB) planes, instead of the luminance (Y).

The general equation for flattening processing is as follows:

Output image$F(x,y)$=Input image$Y(x,y)$*256/Flat frame Blur$(x,y)$ where the value 256 is for a bit depth of 8 bits.

When the equation of Blur plane correction (correction of distribution information) is applied to the above equation, the output image is obtained by the following equation:

Output image$F(x,y)$={$(Y(x,y)-Y(\min)>0?(Y(x,y)-Y(\min):0)$*256/{Blur$(x,y)$*(255-$B$min)/$B$max+$B$min<255?Blur$(x,y)$*(255-$B$min)/$B$max+$B$min:255}.

Figure 17C:
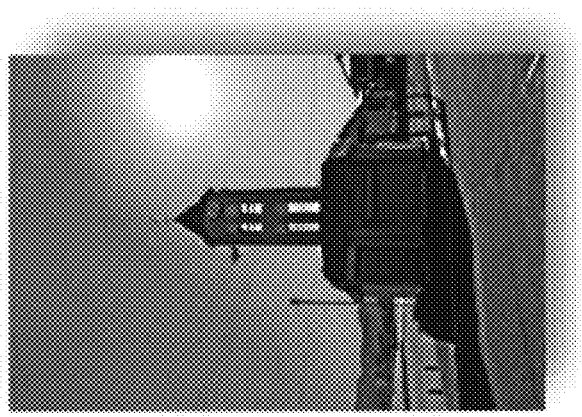
FIG. 17C is an image after flattening processing.
Figure 17B:
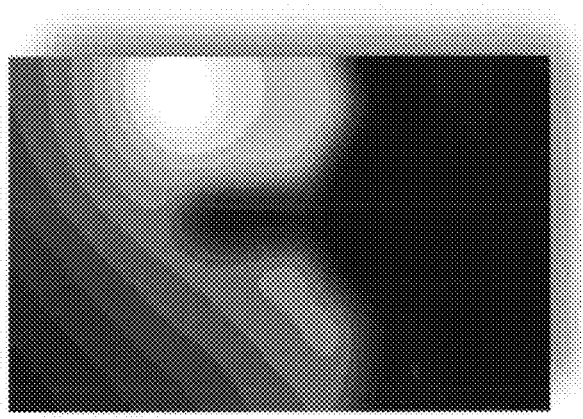
FIG. 17B is an image after Gaussian Blur processing.
Figure 17A:
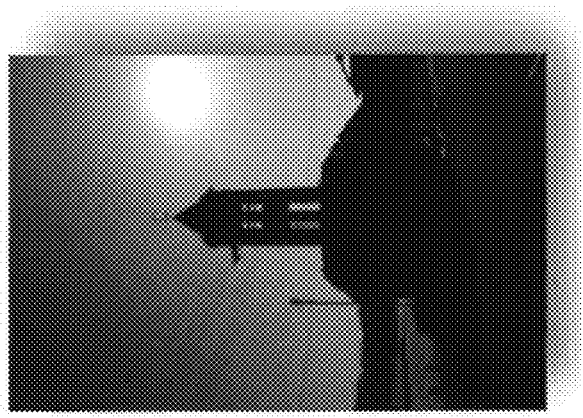
FIG. 17A is an original image.

FIG. 17A is an original image, and black crush occurs in a dark part. FIG. 17B is an image after Gaussian Blur processing, and the luminance is blurred entirely. FIG. 17C is an image after flattening processing, and the dark part that has been blacked out in FIG. 17A can be clearly seen.

Figure 18:
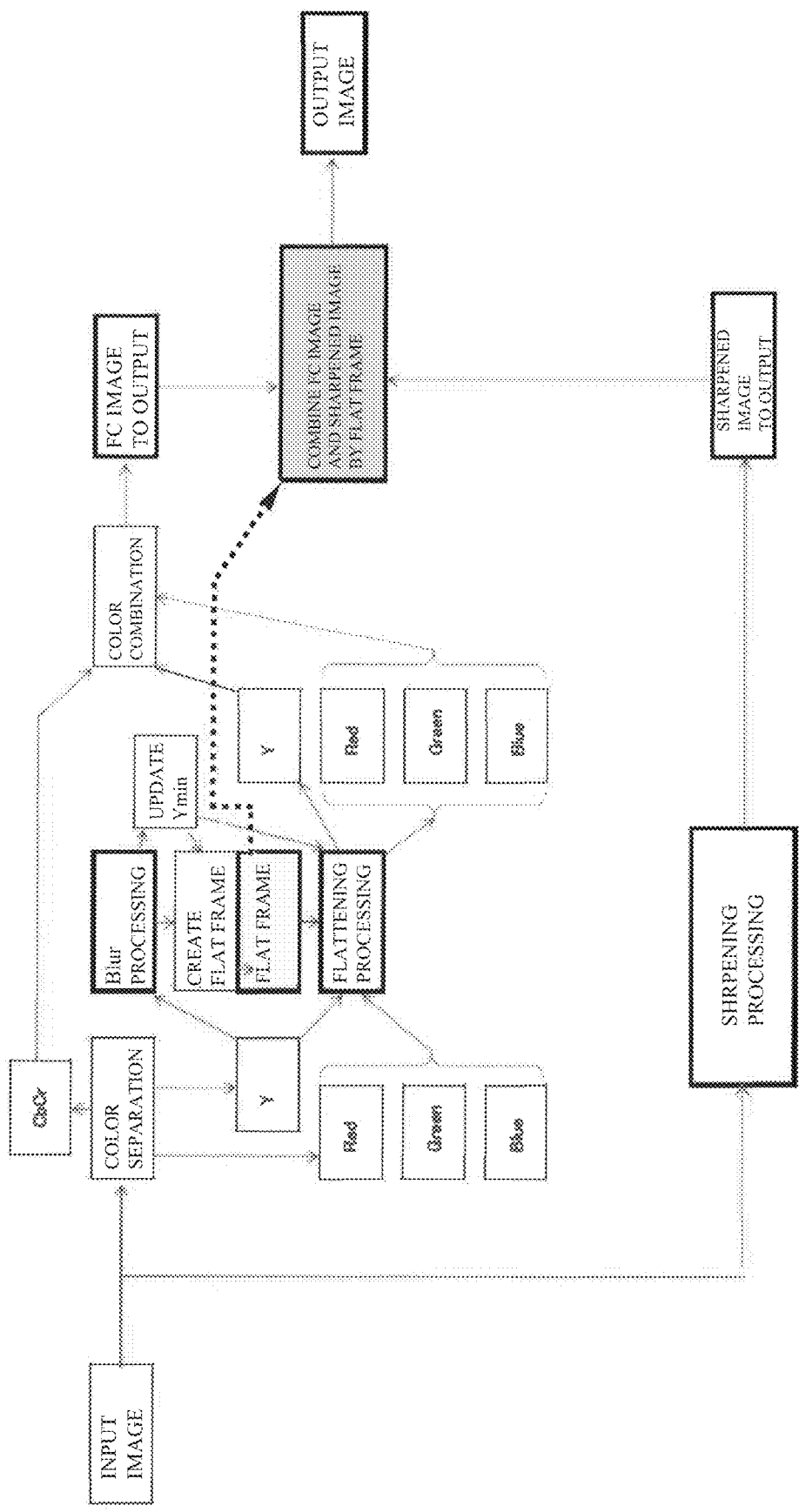
FIG. 18 is a block diagram illustrating the basics of a logical image processing method according to the third aspect of the present invention.

In the third aspect of the present invention, as shown in FIG. 18, an input image is subjected to black crush processing (FC: flat collector) and sharpening processing simultaneously in parallel, and the image after the black crush processing and the image after the sharpening processing are combined based on the flat frame principle used in the black crush processing, in output.

In the black crush process, as shown in FIG. 18, the input image is color-separated, and the hue (CbCr), the luminance (Y), and the three primary colors (RGB) are extracted. In the present invention, the luminance (Y) is subjected to Blur processing and flattening processing and combined with the hue (CbCr) and the three primary colors (RGB) to obtain an output image. Note that, in the present invention, a flat frame (an image having uniformized luminance) is not created, but only the principle of the flat frame is used.

In the Blur processing, an image in which luminance is roughly variable, that is, an image with blurred luminance is created. In the present example, Gaussian Blur processing was performed to blur the image using a Gaussian function.

Figure 19A:
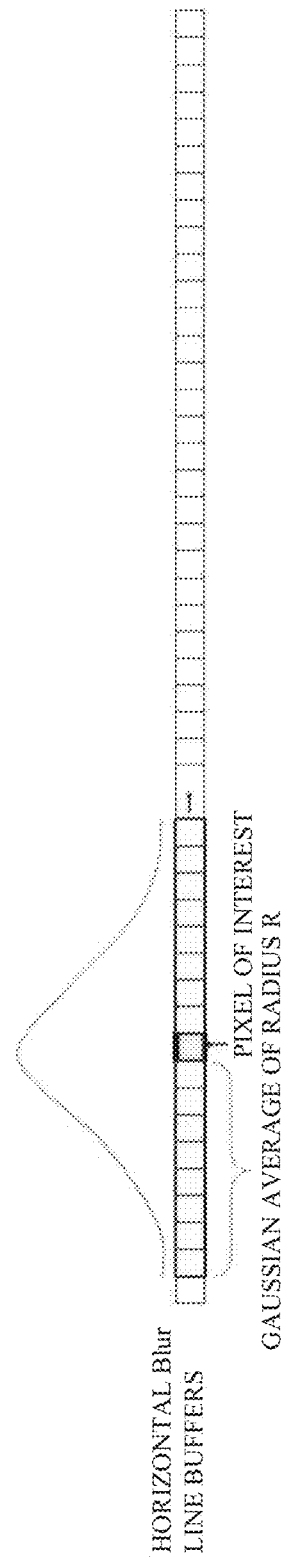
FIG. 19A is a diagram illustrating a horizontal Blur processing in a black crush process.
Figure 19B:
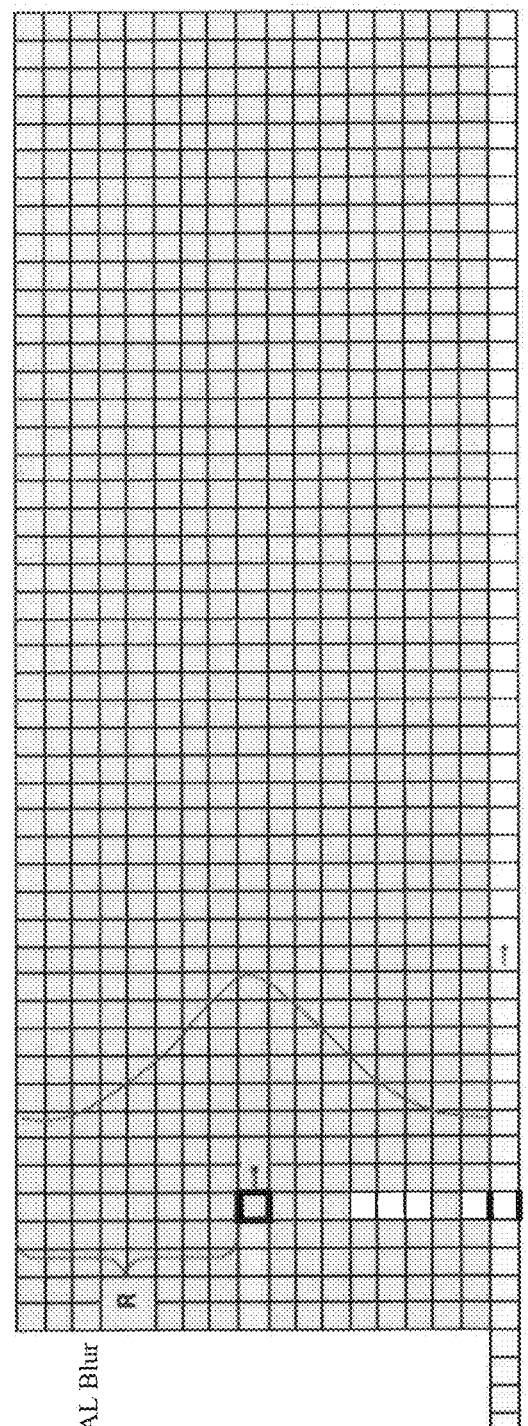
FIG. 19B is a diagram illustrating a vertical Blur process.

In the Gaussian Blur processing, for example, the horizontal Blur processing shown in FIG. 19A is performed, and the vertical Blur processing shown in FIG. 19B is performed on the line buffers after the horizontal Blur processing, to create a blur plane.

In the horizontal Blur processing, the minimum value (Ymin) of the input video image is calculated by averaging the 4 frames, in the past, having the minimum value in the input image.

In addition, during the Gaussian Blur processing, the minimum value (Bmin) and the maximum value (Bmax) of the Blur image are calculated.

In implementing the logic of the present invention, a Gaussian table with radius R is used, and no Gaussian calculation is used. The radius R is 30 pixels at the maximum, and 62 line buffers (30×2+1 at the center+1 for horizontal calculation) are used.

In the illustrated example, for the kernel size of 61×61, the Gaussian Blur processing is divided into horizontal Blur and vertical Blur in order to reduce the regions to process, but a kernel filter may be simply used without dividing.

After creating the Blur plane by the above Gaussian Blur processing, a flat frame is created based on the Blur plane and the minimum value (Ymin) of the input video image. Note that, in the present invention, a flat frame is not created actually, but only the principle of the flat frame is used as described above.

In the creation of the flat frame, the Blur plane is normalized to obtain distribution information having values from 0 to 1.0, then a threshold is set between the normalized values 0 to 1.0. All the pixels having values larger than the threshold are set to 1.0. For the pixels with values smaller than the threshold in a dark part, the luminance magnification (n) of the darkest pixel is determined, and the distribution information is corrected such that the reciprocal of the luminance magnification (1/n) becomes the lowest value of the distribution information.

For example, if the threshold is set to 0.5, among the normalized values 0 to 1.0, the values from 0 to 0.5 fall in a range of 0 to 1.0, and the values of 0.5 or more all become 1.0.

After the corrections, the pixels with a luminance of 0.5 or more in the input image have a value of 1.0 in the distribution information and will not change from the original image in later processing (the input image is divided by the luminance distribution information, the denominator). On the other hand, since the denominator gradually becomes smaller in a dark part, the dark part is corrected such that the darker the original image, the higher the magnification.

The creation of the flat frame is followed by flattening processing. In the flattening processing, a current frame is processed based on the Blur plane and the minimum value (Ymin) of input video image. That is, in the flattening processing, the luminance (Y) and the three primary colors (RGB) of the input image are divided by the Blur plane.

In the above processing, the vertical Blur value of the pixel of interest is determined, which enables the processing from the creation of a Blur plane to the acquisition and correction of distribution information. Accordingly, real-time processing can be performed with only the delay for the line buffers, without using a frame buffer.

The flattening processing includes normal processing and color burst processing. In normal processing, only the luminance (Y) is processed and combined with the hue (CbCr) for output. In the color burst processing, the same calculation is performed for the three primary color (RGB) planes, instead of the luminance (Y).

The general equation for flattening processing is as follows:

Output image $F(x,y)$=Input image$Y(x,y)$*256/Flat frame Blur$(x,y)$ where the value 256 is for a bit depth of 8 bits.

When the equation of Blur plane correction (correction of distribution information) is applied to the above equation, the output image is obtained by the following equation:

Output image $F(x,y)$={$(Y(x,y)-Y(\min)>0?(Y(x,y)-Y(\min):0)$*256/{Blur$(x,y)$*(255-$B$min)/$B$max+$B$min<255?Blur$(x,y)$*(255-$B$min)/$B$max+$B$min:255}.

Figure 20:
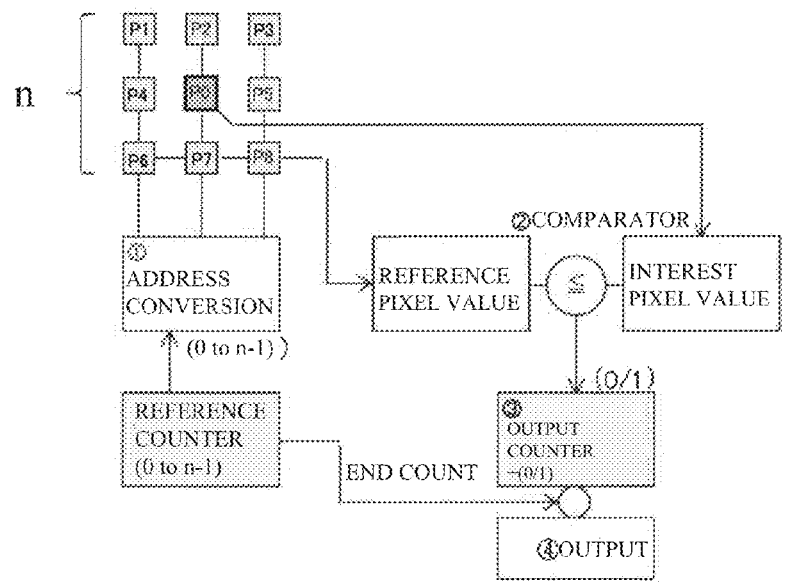
FIG. 20 is a diagram illustrating the basics of sharpening processing.
Figure 21:
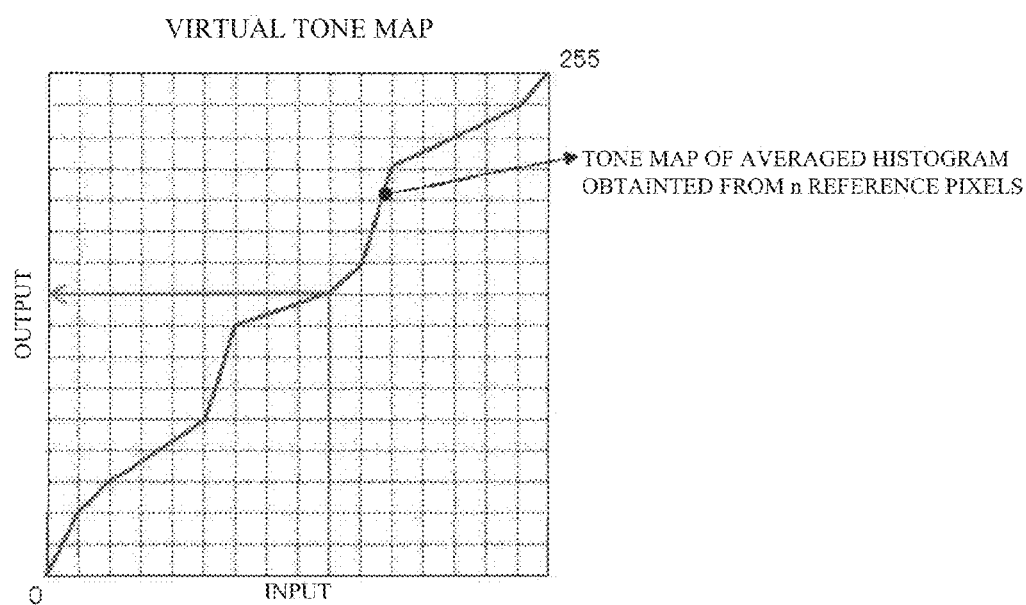
FIG. 21 is a virtual tone map that averaged histograms of reference pixels corresponding to FIG. 20.

Next, the sharpening process will be described with reference to FIG. 20 and the subsequent figures. In FIG. 20, the mark P0 is a pixel of interest, and the brightness (luminance) of the pixel of interest P0 is to be adjusted. FIG. 21 is a virtual tone map in which the execution results obtained from the reference pixels (8 in FIG. 20 as reference pixels P1 to P8) when processed by the method of FIG. 20 are graphed at all the brightness that the reference pixels can have.

The present invention is directed to obtain only one conversion result for the pixel of interest from the pixel of interest and the reference pixels, and not to output a tone map.

The processing procedure includes: first, the luminance of the pixel of interest P0 and those of the reference pixels P1 to P8 around it are compared; the number of the reference pixels having a luminance smaller than the luminance of the pixel of interest P0 is counted; and the luminance of the pixel of interest P0 is corrected in accordance with the resulting count value by a predetermined algorithm.

For example, when the number of the reference pixels having a luminance smaller than the luminance of the pixel of interest P0 is 1, and the number of the reference pixels having a luminance larger than the luminance of the P0 is 7, the luminance value of each of the reference pixels is corrected to ⅛ of that, with the maximum luminance to be output being set to 1. Note that the correction algorithm is not limited to this one.

When the above processing is implemented on an FPGA or CPU, the pixel of interest is moved one by one in the row direction, and the processing is performed in parallel for each row, so as to correct the luminance of all the pixels and smooth the brightness.

When the above processing is implemented on a GPU, since the operations are independently implemented on each pixel, the processing is performed in parallel on multiple cores simultaneously, so as to correct the luminance of all the pixels and smooth the brightness.

Note that the virtual tone map of FIG. 21 is not actually created by the algorithm and shows an execution result of the logic for the entire input luminance for better understanding.

There is room for improvement in the above implementation example. Specifically, the virtual tone map of FIG. 21 includes three points where the output suddenly increases with respect to the input, more specifically, where the inclination angle is 45° or more. These points represent where the brightness prominently increases, due to noise for example.

Figure 22:
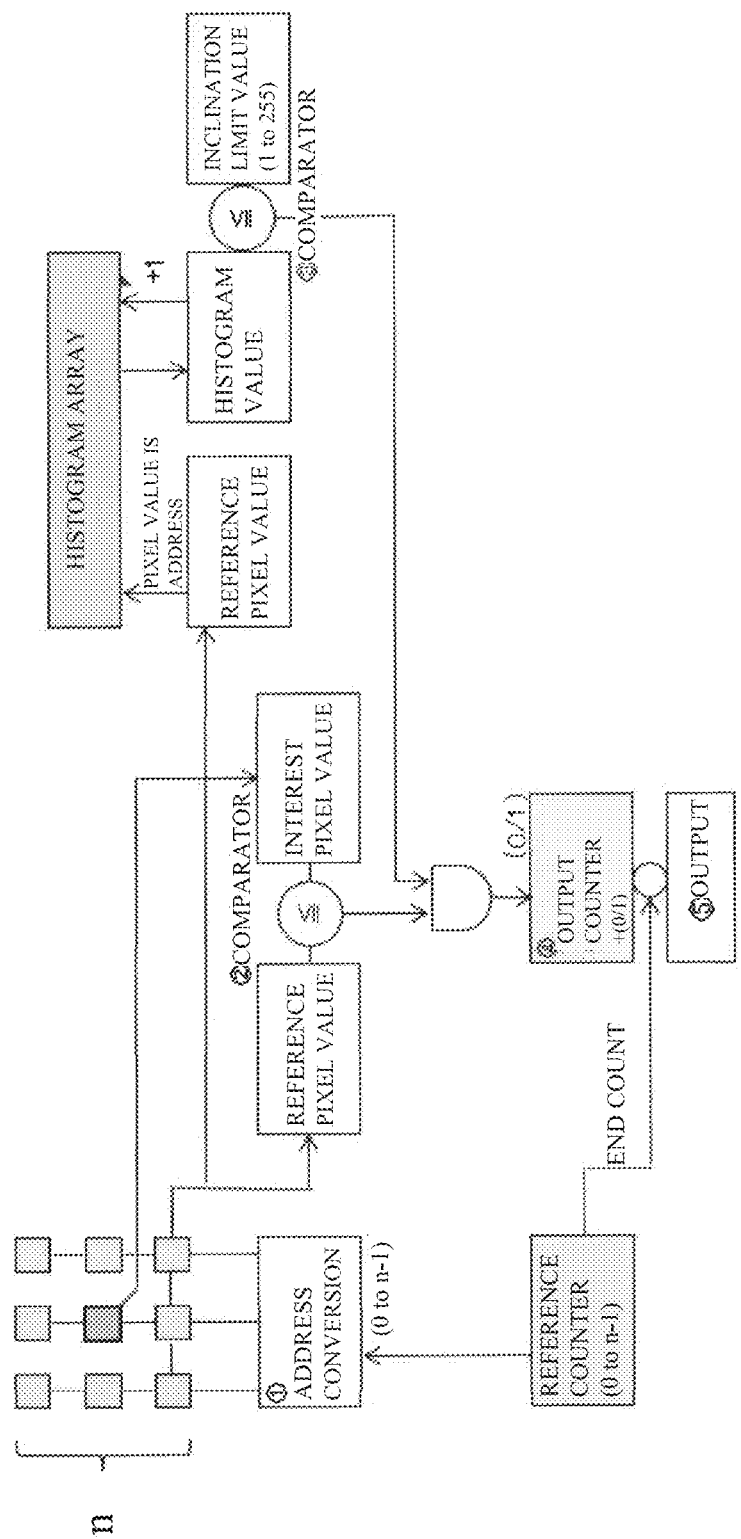
FIG. 22 is a diagram showing an implementation example of sharpening processing.
Figure 23:
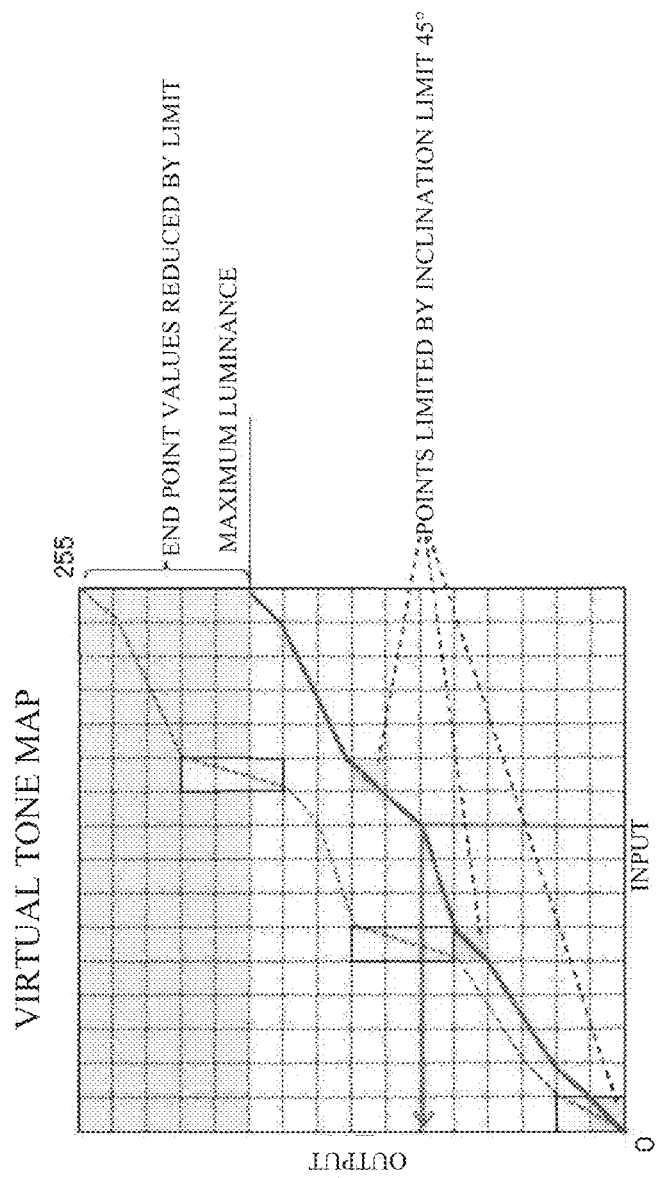
FIG. 23 is a virtual tone map corresponding to FIG. 22.

FIG. 22 is a diagram showing an implementation example in which the above processing is improved, FIG. 23 is a virtual tone map corresponding to FIG. 22, and the dotted line in FIG. 23 is a virtual tone map when the logic of FIG. 18 is executed.

In order to eliminate such a part where the brightness is prominent, the pixel values (luminance) of reference pixels P1 to P8 are sequentially compared with the pixel value of the pixel of interest P0 to determine whether or not they are equal to or less than the pixel value of the pixel of interest P0.

In parallel with the above processing, the histogram value of each of the reference pixels is incremented by 1 and compared with the inclination limit value (45°) to determine whether it is equal to or less than the inclination limit value.

Then, the number of the reference pixels satisfying both of the above two determinations is counted as a true-in-both count value, and the brightness of the pixel of interest is output based on the true-in-both count value.

After the above processing, as shown by the solid line in FIG. 23, an easy-to-see image without a part where the brightness prominently changes can be obtained.

The inclination limit was taken into consideration, by counting the number of the reference pixels having a pixel value equal to or less than the value of the pixel of interest, comparing the histogram value of each of the reference pixels that was incremented by 1 with a preset inclination limit value, counting the number of reference pixel having the histogram value less than or equal to the inclination limit value, and counting the number of the reference pixels that are true in both as a true-in-both count value.

Under this condition, however, the entire image may be darkened. A configuration for correcting the darkness is shown in the virtual tone maps of FIGS. 24 and 25.

Figure 24:
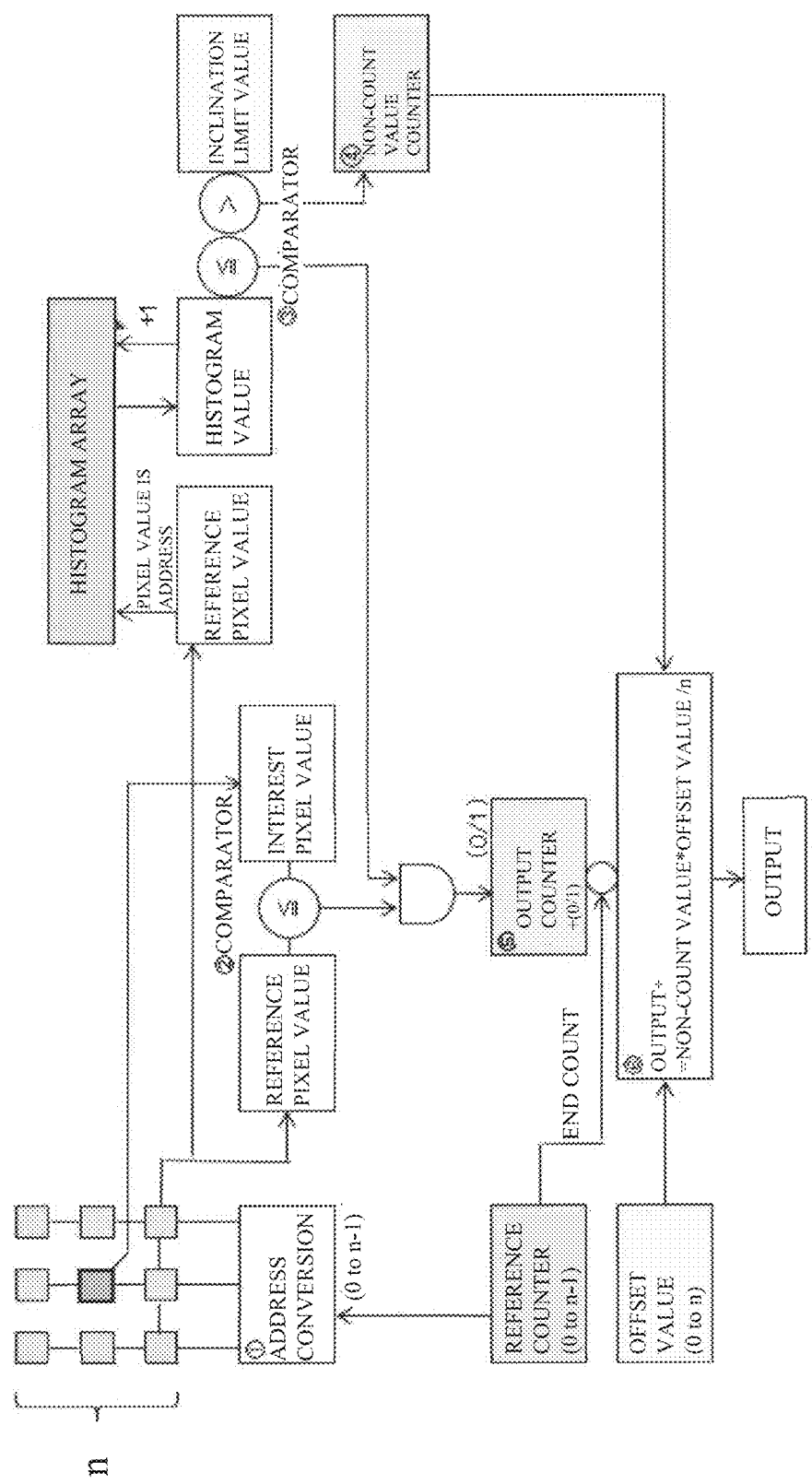
FIG. 24 is a diagram showing another implementation example of sharpening processing.

In the implementation example shown in FIG. 24, the number of the reference pixels satisfying both the conditions of being equal to or less than the pixel value of the pixel of interest P0 and being equal to or less than the inclination limit value is set as a true-in-both count value, and further, the number of the reference pixels (a non-count value) is counted that have a histogram value larger than the inclination limit value, so that an offset value of luminance is set as an external parameter of a value from 0 to n, and the true-in-both count value is added by (a non-count value× offset value/n) for output.

Here, the offset value is determined by what percentage of the brightness (a+b) of the end point value that was reduced by the inclination limit is raised.

Output=True-in-both Count value+(Non-Count value×Offset Value/$n$)

where n is the number of the reference pixels, for example, 128 or 256, and the offset value is from 0 to n.

Figure 25:
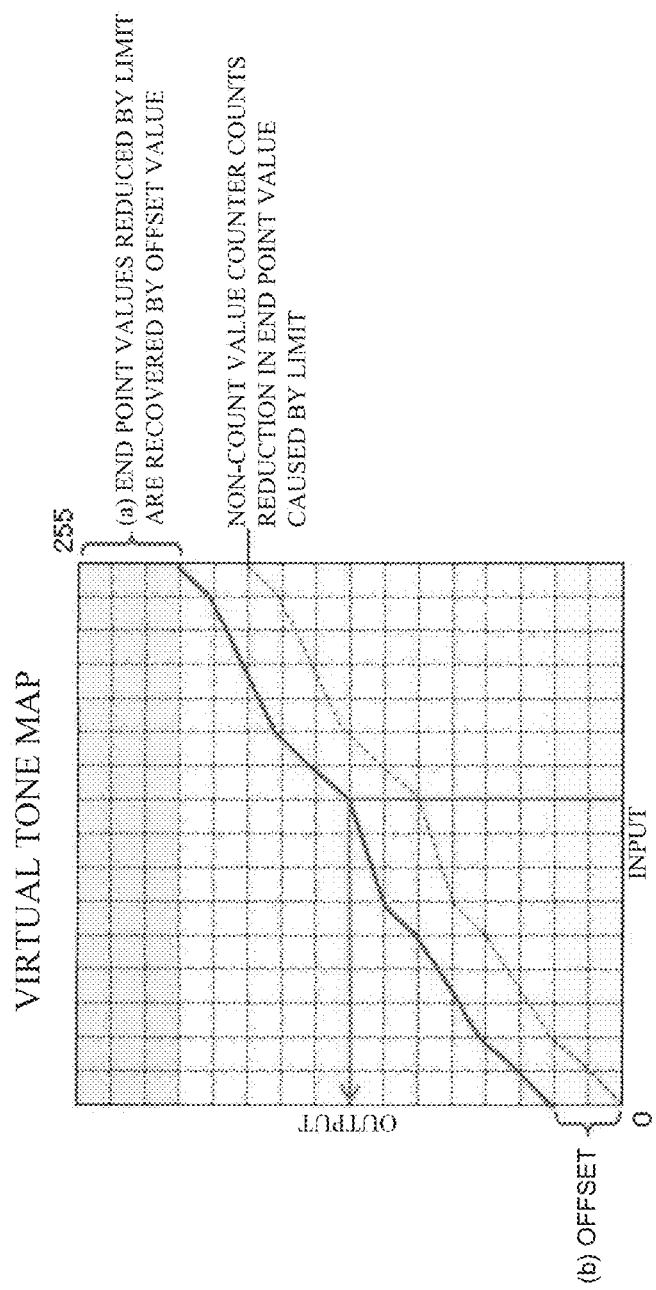
FIG. 25 is a virtual tone map corresponding to FIG. 24.

As a result of the above processing, as shown in FIG. 25, no change occurs in the virtual tone map characteristics of the image, but the entire image becomes brighter by the offset value.

Figure 26:
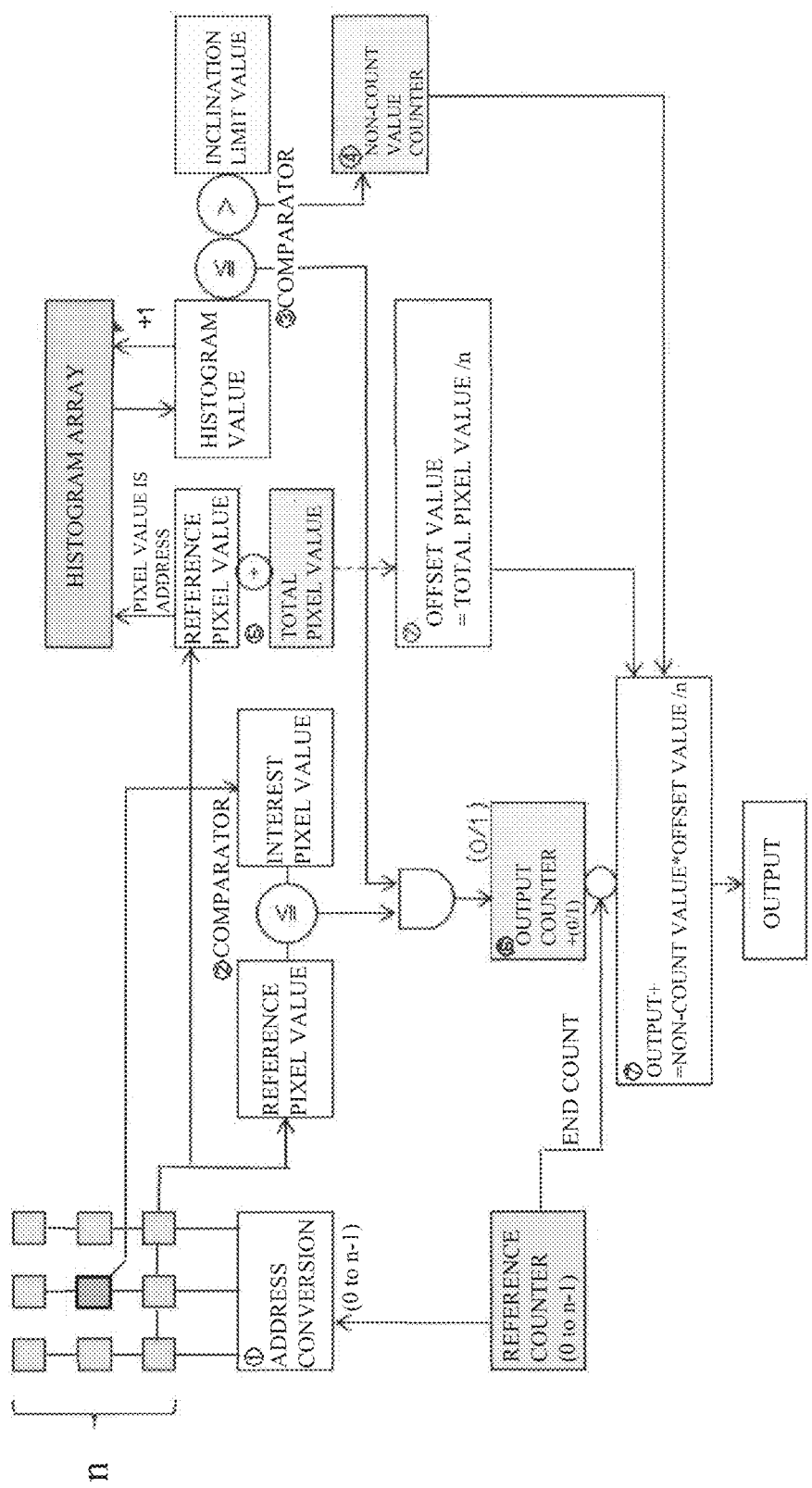
FIG. 26 is a diagram showing another implementation example of sharpening processing.

FIG. 26 is an example showing an implementation example in which the above-mentioned offset value is automatically calculated for each region. In this implementation example, the read-out values of the reference pixels and the value of the pixel of interest are compared, the histogram value of each of the reference pixels is incremented by 1 and compared with a preset inclination limit value, and the number of the reference pixels that have a histogram larger than the inclination limit value is counted as a non-count value.

In parallel with the above processing, the values of the reference pixels less than or equal to the preset inclination limit value are simply summed up and divided by the number of the reference pixels to calculate the average value. The resulting average value is divided by the maximum luminance of the pixel (256 for 8 bits) to be proportionally distributed between 0 and n to obtain an offset value. That is, by using the average luminance itself of the reference pixels as the offset value, the luminance of the pixel of interest P0 can be matched with the luminance around it.

Then, as shown below, the (non-count value×offset value/ n) is added to the true-in-both count value for output.

Output=True-in-both Count value+(Non-Count value×Offset Value/$n$)

Figure 27:
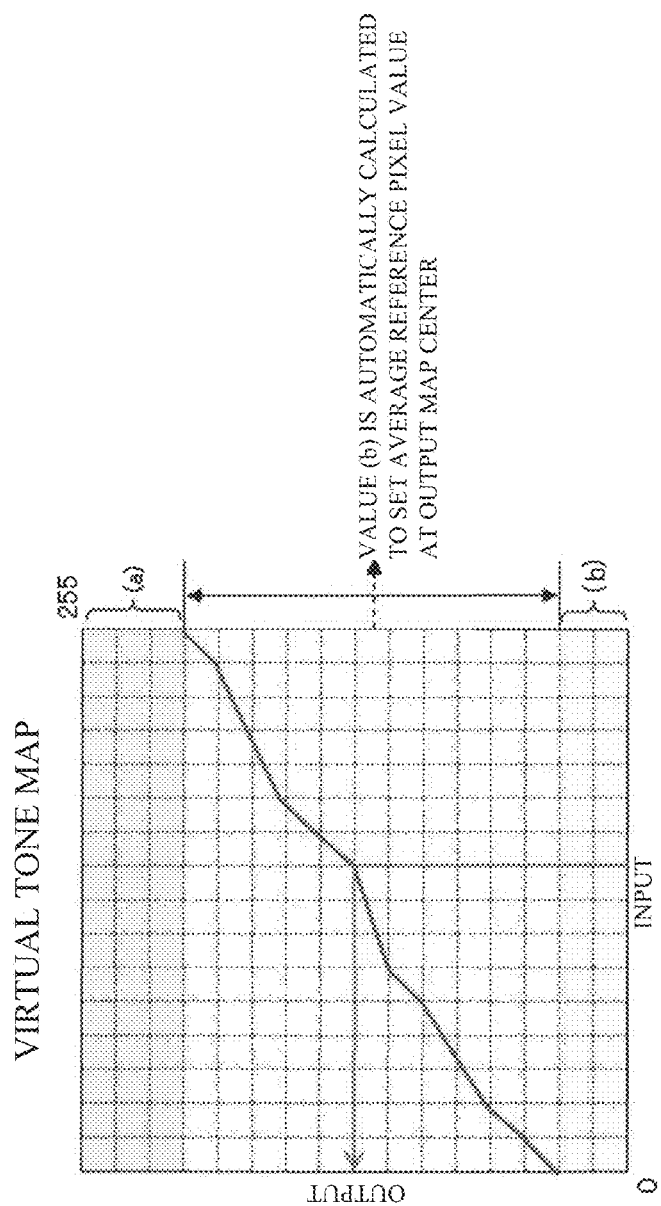
FIG. 27 is a virtual tone map corresponding to FIG. 26.

FIG. 27 is a virtual tone map obtained by the above processing. In this implementation example, by using the average luminance of the reference pixels as an offset value, a tone map can be automatically generated where the brightness of the pixel of interest matches with those around it.

Figure 28:
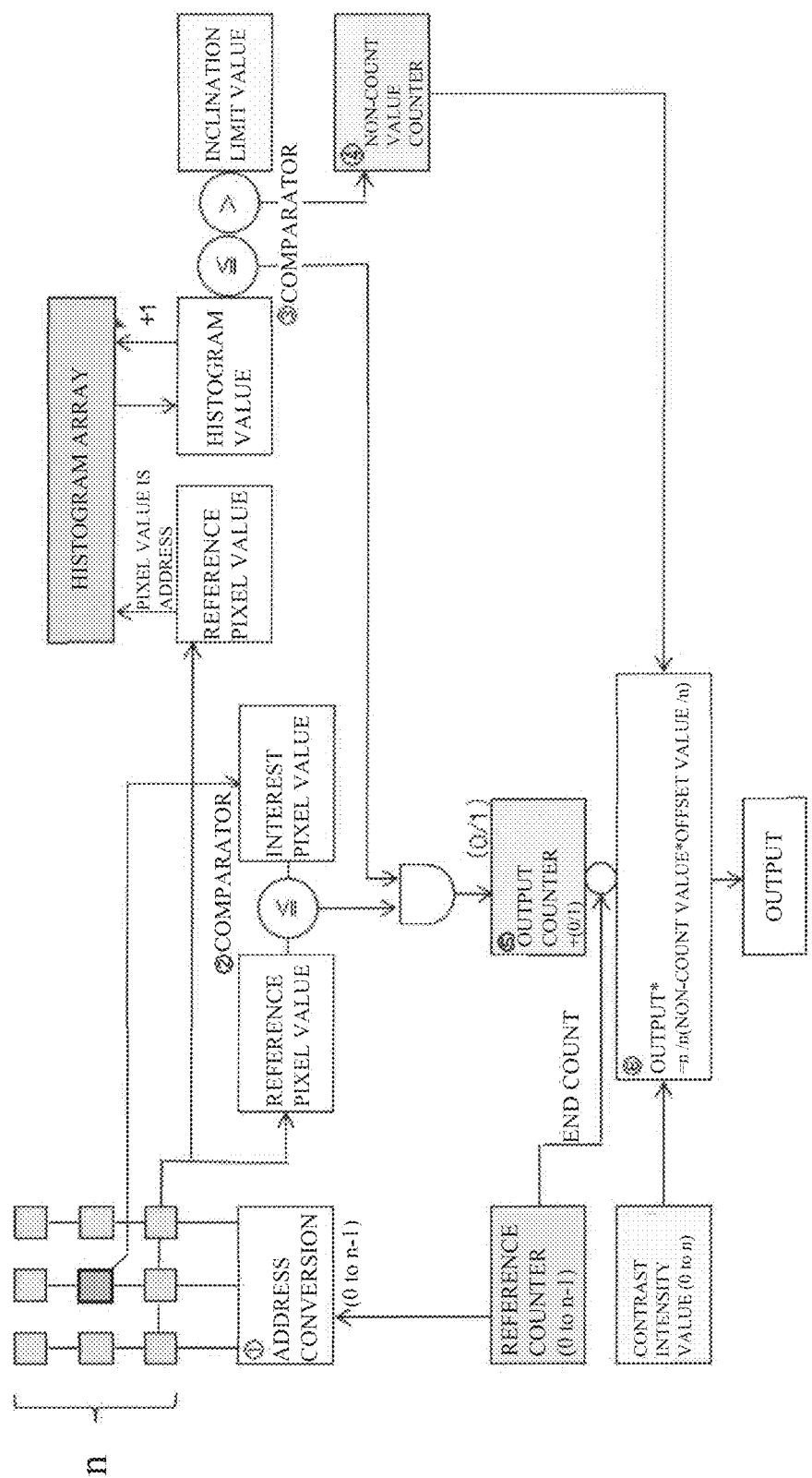
FIG. 28 is a diagram showing another implementation example of sharpening processing.

Through the above-mentioned image processing, the part where the brightness is extremely eminent from the surroundings is eliminated, and the entire image is not darkened, but the contrast of the entire image may be insufficient. An implementation example for solving this problem is shown in FIG. 28.

In this implementation example, the number of the reference pixels satisfying both the conditions of being less than or equal to the pixel value of the pixel of interest P0 and being less than or equal to the inclination limit value is set as a true-in-both count value, and furthermore, the number of the reference pixels (a non-count value) having a histogram larger than the inclination limit value is counted.

The contrast intensity values are then set as external parameters of values from 0 to n, and the true-in-both count value is multiplied by {n/(n−non-count value×intensity value/n)}, to output the luminance of pixel of interest P0.

Output=True-in-both Count value×n/(n−Non-Count value×Intensity Value/n)

where n is the number of the reference pixels, for example, 128 or 256, and the intensity value is from 0 to n.

Figure 29:
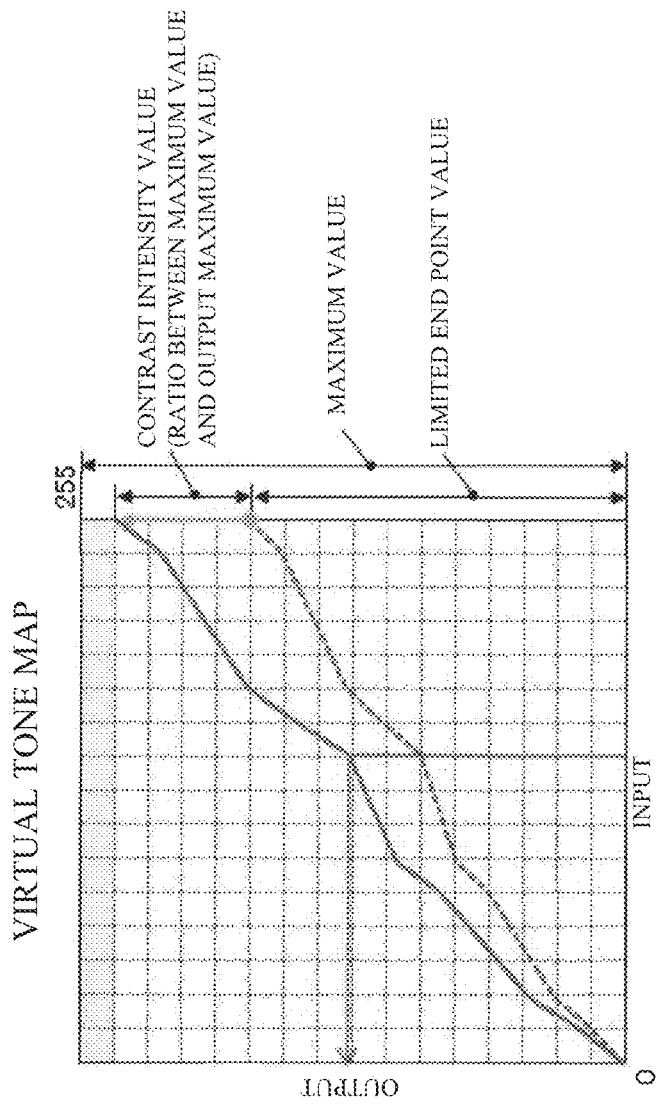
FIG. 29 is a virtual tone map corresponding to FIG. 28.

FIG. 29 shows a virtual tone map of the image obtained through the above processing. In the above-mentioned implementation example, the end point value (maximum luminance) reduced by the inclination limit is uniformly raised by the offset value. The present implementation example, however, includes multiplication processing, also resulting in changing of the inclination.

Figure 30:
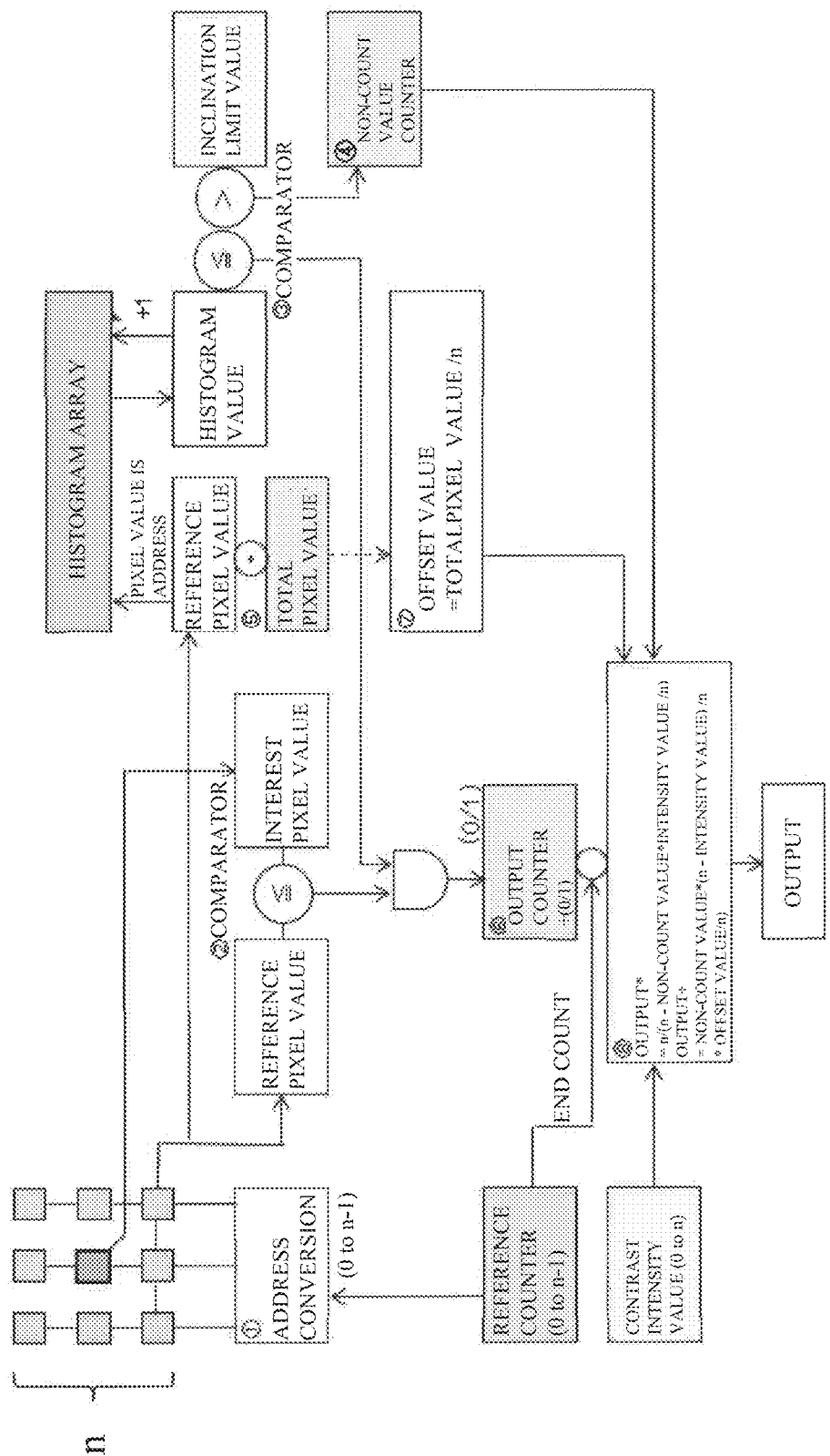
FIG. 30 is a diagram showing another implementation example of sharpening processing.

FIG. 30 shows an implementation example in which the offset function and the contrast function are simultaneously exhibited. In this implementation example, the number of the reference pixels satisfying both the conditions of being less than or equal to the pixel value of the pixel of interest P0 and being less than or equal to the inclination limit value is set as a true-in-both count value, and in parallel to the above, the values of reference pixel less than or equal to the preset inclination limit value are simply summed up and divided by the number of the reference pixels to calculate the average value, which is set as an offset value.

Then, the true-in-both count value is multiplied by {n/(n−non-count value×intensity value/n)} and added by {non-count value×(n−intensity value)/n×offset value/n} to output. That is, the following equation is used:

Output=True-in-both Count value×{n/(n−Non-Count value×Intensity Value/n)}+{Non-Count value×(n−Intensity Value)/n×Offset Value/n} where n is the number of the reference pixels, for example, 128 or 256, and the offset value and the intensity value are from 0 to n.

Through each above-described processing, the part whose brightness is extremely different (for example, due to noise) from the surroundings is eliminated, and the contrast of the entire image can be corrected. However, such processing tends to cause bias in specific luminance in a region mostly constituted by pixels of the same value. For example, if the pixel values are biased to 0 in a dark image, a problem that the image becomes whitish arises.

Figure 31:
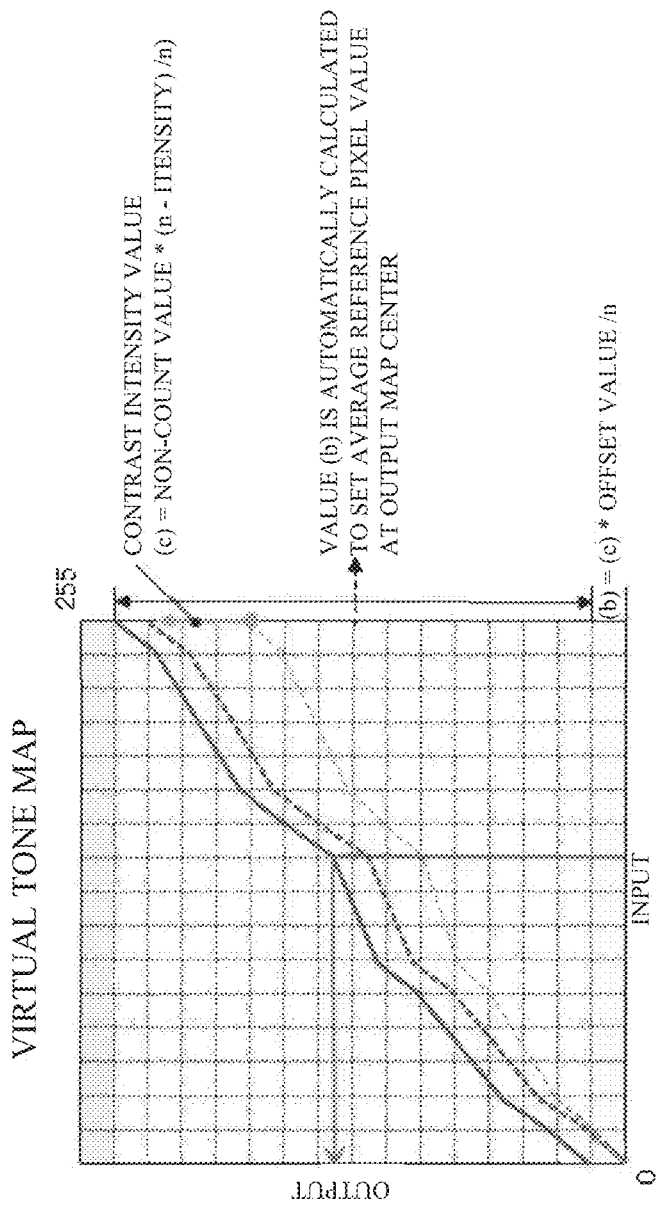
FIG. 31 is a virtual tone map corresponding to FIG. 30.
Figure 32:
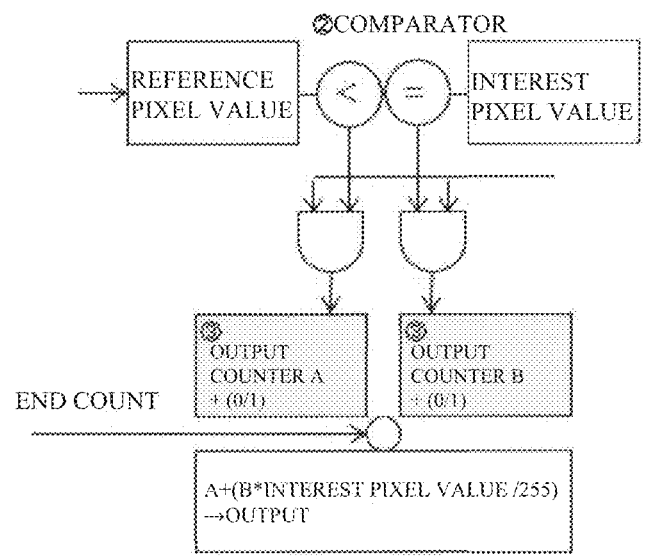
FIG. 32 is a diagram showing another implementation example of sharpening processing.

FIG. 31 is a diagram obtained by further improving the parts shown in FIG. 22. In this implementation example, two comparators for comparing the values of the reference pixels and the value of the pixel of interest are prepared, so that the number of the reference pixels having a luminance less than the value of the pixel of interest and being equal to or less than the inclination limit value and the number of the reference pixels having a luminance equal to the value of the pixel of interest and being equal to or less than the inclination limit are individually counted.

The resulting count number of the reference pixels having a luminance equal to the value of the pixel of interest is proportionally added to the resulting count number of the reference pixels having a luminance less than the value of the pixel of interest, in accordance with the luminance of interest.

Figure 33:
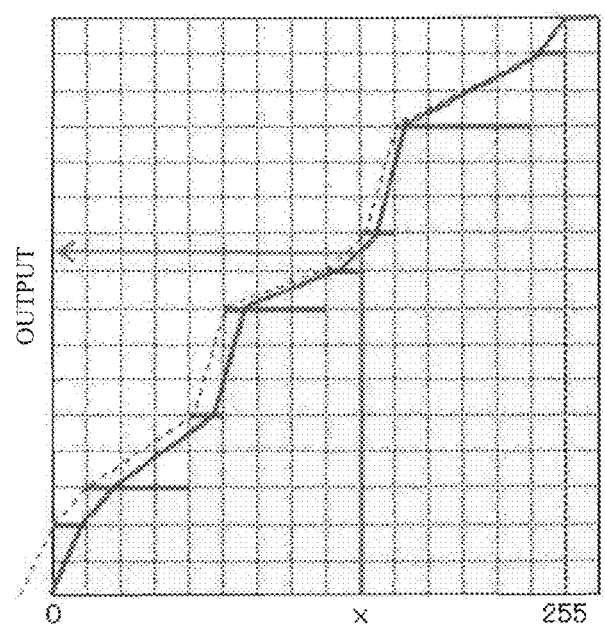
FIG. 33 is a virtual tone map corresponding to FIG. 32.

As shown in FIG. 33, the addition processing provides a tone map where the end point (maximum luminance) is fixed, and the start point is moved to the origin (0, 0).

As described above, once the black-crush corrected image (FC output image) and the sharpened output image are obtained, these images are combined using the principle of flat frame. In the combining in the present invention, the black-crush corrected image and the sharpened output image are not simply blended. Instead, the black-crush corrected image is more distributed in a dark part and the sharpening output image is more distributed in a bright part.

When the above processing is implemented in a CPU, flat frames are actually generated, and then the calculation is performed between the frames.

In the case of real-time processing in a circuit such as FPGA, instead of actually creating a flat frame for one frame buffer, a line buffer is used and a ring buffer for the diameter of blur (that is repeatedly used as much as necessary) is used for real-time processing. That is, instead of creating a flat frame for one screen, a laterally-long thin flat frame is generated for each scan line in synchronization with the scanning of the screen.

The above processing is the same, as in the case of the flat frame that is used in the black crush correction, in that real-time processing is performed using a line buffer with a delay of the blur diameter of the flat frame. In the case of black crush correction, however, the brightness information is blurred with Gaussian and then the level is corrected to make a flat frame, and the values for the level correction at the screen composition may be different from the correction values for the black crush correction. Accordingly, the information is kept in the line buffer in a state where the brightness is only blurred by Gaussian, and different level corrections are performed for the black crush correction and the screen composition. Note that the level correction is completed only by addition and multiplication, and thereby the calculation is achievable in real time immediately before output.

Figure 34A:
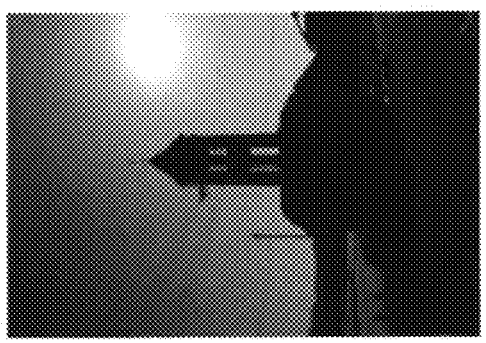
FIG. 34A is an original image.
Figure 34B:
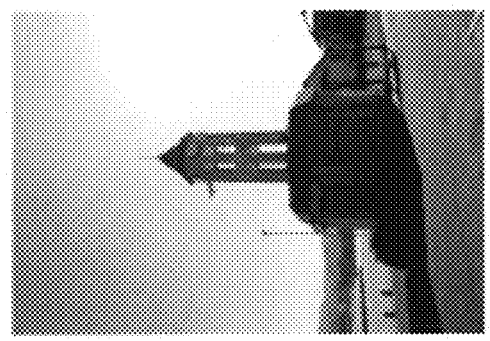
FIG. 34B is an image after black crush processing.
Figure 34C:
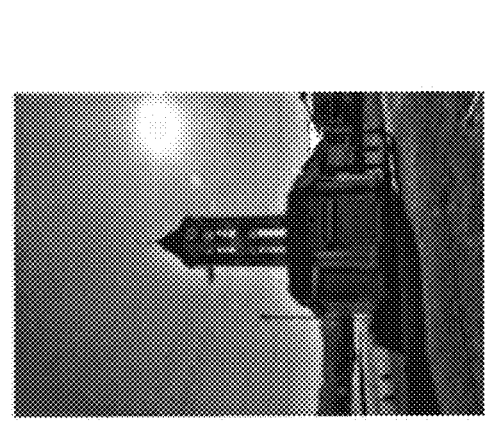
FIG. 34C is an image after sharpening processing.
Figure 34D:
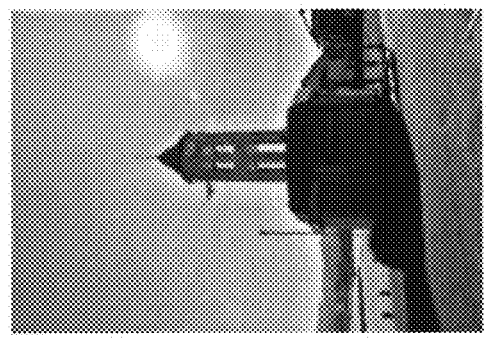
FIG. 34D is an image after image combining (the present invention).

FIG. 34A is an original image, in which black crush occurs in a dark part and is blurred in some parts. FIG. 34B is an image after black crush processing, in which black crush is eliminated but the contrast is insufficient in the bright part with the electric wire being overexposed. FIG. 34C is an image after sharpening processing, in which the dark part is excessively emphasized and the particles in the backlit part are disturbed. FIG. 34D is an image after image combining (the present invention), in which the problems in black crushing processing and sharpening processing are both solved, the electric wire can be visually recognized, and the particles in the backlit portion are arranged.

The invention claimed is:
1. An image processing method, comprising:
in order to process captured image data on a pixel-by-pixel basis, setting n reference pixels around a pixel of interest to be scanned in image scanning, where n is an integer;
sequentially comparing a pixel value as luminance of the pixel of interest with a pixel value as luminance of each of the reference pixels;
counting a number of the reference pixels whose pixel values are less than or equal to the pixel value of the pixel of interest;

in parallel with the counting, incrementing a histogram value of each of the reference pixels by 1 to compare with a preset inclination limit value;

counting a number of the reference pixels satisfying both a condition that the reference pixel value is less than or equal to the pixel value of the pixel of interest and a condition that the histogram value is less than or equal to the inclination limit value, so as to obtain a true-in-both count value; and proportionally distributing the true-in-both count value for output.

2. The image processing method according to claim 1, further comprising:

counting a number of the reference pixels that are not counted in comparison with the inclination limit value, as a non-count value;

setting an offset value of luminance as an external parameter; and applying the values to Equation (1) for output, so as to adjust a brightness of an entire screen, Equation (1) being Output=True-in-both Count Value+(Non-Count value×Offset Value/n), where n is the number of the reference pixels.

3. The image processing method according to claim 2, further comprising:

counting the number of the reference pixels that are not counted in comparison with the inclination limit value, as a non-count value;

setting a contrast intensity value as an external parameter; and applying the values to Equation (2) for output to make an adaptive contrast intensity value, Equation (2) being Output={True-in-both Count Value+(Non-Count value×Offset Value/n}×n/(n−Non-Count Number× Contrast Intensity Value/n), where n is the number of the reference pixels, and the intensity value is from 0 to n.

4. The image processing method that uses the offset value according to claim 2, further comprising:

setting a contrast intensity value as an external parameter;

calculating an average value of the pixel values of the reference pixels;

counting the number of the reference pixels that are not counted in comparison with the inclination limit value, as a non-count value; and applying the average value, the non-count value, and the contrast intensity value to Equation (3) for output, Equation (3) being Output=Output according to claim 2×{n/(n−Non-Count value×Contrast Intensity Value/n}+{Non-Count value×(n−Contrast Intensity Value)/ n×Offset Value/n}, where n is the number of the reference pixels, and the intensity value is from 0 to n.

5. The image processing method according to claim 1, further comprising:

calculating an average value of the pixel values of the reference pixels and setting the average value as an offset value of luminance; and adding, to output, the offset value adaptive to the pixel of interest so as to adaptively and automatically adjust the brightness of the screen.

6. The image processing method that uses the offset value according to claim 5, further comprising:

setting a contrast intensity value as an external parameter;
calculating an average value of the pixel values of the reference pixels;

counting the number of the reference pixels that are not counted in comparison with the inclination limit value, as a non-count value; and applying the average value, the non-count value, and the contrast intensity value to Equation (3) for output, Equation (3) being Output=Output according to claim 3×{n/(n−Non-Count value×Contrast Intensity Value/ n}+{Non-Count value×(n−Contrast Intensity Value)/ n×Offset Value/n}, where n is the number of the reference pixels, and the intensity value is from 0 to n.

7. The image processing method according to claim 1, further comprising:

comparing the pixel value of the pixel of interest with the pixel value of each of the reference pixels to separately count the number of the reference pixels having a pixel value equal to the pixel value of the pixel of interest and the number of the reference pixels having a pixel value less than the pixel value of the pixel of interest; and adding a former number of the pixels to a latter number of the pixels in proportion to the pixel value of the pixel of interest so as to calculate a true-in-each count number.

8. An image processing method, comprising:

performing Gaussian Blur processing on luminance of each pixel in a Y plane memory of an input image to calculate a Blur value with blurred luminance;

normalizing the Blur value to obtain distribution information having values from 0 to 1.0;

setting a threshold among the normalized values of 0 to 1.0;

setting all of the pixels having a value larger than the threshold to 1.0;

determining a luminance magnification (n) of a darkest pixel among the pixels having values smaller than the threshold in a dark part;

correcting the distribution information such that a reciprocal of the luminance magnification (1/n) becomes a lowest value of the distribution information; and dividing the luminance of the input image by the corrected luminance distribution information (1/n to 1.0) of the dark part.

9. The image processing method according to claim 8, wherein a calculation result of the Blur value is buffered only by a line buffer and processed in parallel with the correcting the distribution information.

10. An image processing method, comprising:

combining an image that has been subjected to sharpening processing and an image that has been subjected to black crush processing, the black crush processing including performing Gaussian Blur processing on luminance of each pixel in a Y plane memory of an input image to calculate a Blur value with blurred luminance, normalizing the Blur value to obtain distribution information having values from 0 to 1.0, setting a threshold among the normalized values of 0 to 1.0, setting all of the pixels having a value larger than the threshold to 1.0, determining a luminance magnification (n) of a darkest pixel among the pixels having values smaller than the threshold in a dark part, correcting the distribution information such that a reciprocal of the luminance magnification (1/n) becomes a lowest value of the distribution information, and dividing the luminance of the input image by the corrected luminance distribution information (1/n to 1.0) of the dark part.

11. The image processing method according to claim 10, wherein the sharpening processing includes in order to process image data on a pixel-by-pixel basis, setting n reference pixels around a pixel of interest to be scanned in image scanning, where n is an integer, sequentially comparing a pixel value as luminance of the pixel of interest with a pixel value as luminance of each of the reference pixels, counting a number of the reference pixels whose pixel values are less than or equal to the pixel value of the pixel of interest, in parallel with the counting, incrementing a histogram value of each of the reference pixels by 1 to be compared with a preset inclination limit value, counting a number of the reference pixels satisfying both a condition that the reference pixel value is less than or equal to the pixel value of the pixel of interest and a condition that the histogram value is less than or equal to the inclination limit value, so as to obtain a true-in-both count value, and proportionally distributing the true-in-both count value for output.

* * * * *